(12) United States Patent
Han et al.

(10) Patent No.: US 12,465,190 B2
(45) Date of Patent: *Nov. 11, 2025

(54) MONITORING AND CONTROL OF THERMAL SANITIZATION IN AUTOMATED CLEANING MACHINES

(71) Applicant: Ecolab USA Inc., St. Paul, MN (US)

(72) Inventors: Elizabeth Minhee Han, St. Paul, MN (US); Conor Sylvester Smith, Saint Louis Park, MN (US); Paul R. Kraus, Apple Valley, MN (US); Paul Dominic Christian, Apple Valley, MN (US); Rachel Marie McGinness, Rosemount, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,380

(22) Filed: Apr. 26, 2023

(65) Prior Publication Data

US 2023/0337891 A1    Oct. 26, 2023

Related U.S. Application Data

(63) Continuation of application No. 17/193,507, filed on Mar. 5, 2021, now Pat. No. 11,666,198.

(Continued)

(51) Int. Cl.
*A47L 15/00* (2006.01)
*A47L 15/42* (2006.01)

(52) U.S. Cl.
CPC ....... *A47L 15/0036* (2013.01); *A47L 15/0026* (2013.01); *A47L 15/0028* (2013.01);
(Continued)

(58) Field of Classification Search
None
See application file for complete search history.

(56) References Cited

U.S. PATENT DOCUMENTS

D227,117 S    6/1973  Breger
4,735,219 A   4/1988  Seeland
(Continued)

FOREIGN PATENT DOCUMENTS

CA    2541480 A1    9/2006
CN    1197137 A    10/1998
(Continued)

OTHER PUBLICATIONS

Advisory Action from U.S. Appl. No. 17/193,314 dated Jun. 27, 2024, 3 pp.
(Continued)

*Primary Examiner* — Rita P Adhlakha
(74) *Attorney, Agent, or Firm* — Shumaker & Sieffert, P.A.

(57) ABSTRACT

Systems and/or methods for the monitoring and/or control of thermal sanitization in automated cleaning machines are described. A cleaning machine controller may predict a number of heat unit equivalents that will be delivered during a cleaning process based on a sump temperature difference (i.e., a change in the temperature of the cleaning solution in the sump) experienced at or near the beginning of the cleaning process. One or more cleaning process parameters may be adjusted and/or controlled based on the sump temperature difference in order to ensure that a target number of heat unit equivalents are delivered in order to achieve thermal sanitization of the wares subjected to the cleaning process.

20 Claims, 11 Drawing Sheets

Related U.S. Application Data

(60) Provisional application No. 63/086,744, filed on Oct. 2, 2020.

(52) U.S. Cl.
CPC ....... *A47L 15/0044* (2013.01); *A47L 15/0063* (2013.01); *A47L 15/4287* (2013.01); *A47L 2401/12* (2013.01); *A47L 2401/20* (2013.01); *A47L 2501/06* (2013.01)

(56) References Cited

U.S. PATENT DOCUMENTS

| | | | |
|---|---|---|---|
| D427,315 S | 6/2000 | Saltzstein et al. | |
| 6,463,940 B1 | 10/2002 | Thomas et al. | |
| 6,615,850 B1 | 9/2003 | Hornung | |
| 6,622,754 B1 | 9/2003 | Roth et al. | |
| 7,437,213 B2 | 10/2008 | Batcher | |
| D605,588 S | 12/2009 | Nomi et al. | |
| 7,695,568 B2 | 4/2010 | Gaus | |
| D677,669 S | 3/2013 | Liu | |
| D699,246 S | 2/2014 | Ringlein | |
| D715,284 S | 10/2014 | Iwamoto | |
| 9,041,985 B2 | 5/2015 | Kasahara et al. | |
| D730,886 S | 6/2015 | Tseng | |
| 9,289,107 B2 | 3/2016 | Ellingson et al. | |
| 9,329,159 B2 | 5/2016 | Walicki | |
| D768,138 S | 10/2016 | Malsan | |
| 9,473,653 B2 | 10/2016 | Hayashi | |
| D788,778 S | 6/2017 | Magi et al. | |
| D795,323 S | 8/2017 | Melamed et al. | |
| D808,947 S | 1/2018 | Taniho et al. | |
| D837,180 S | 1/2019 | Silva | |
| 10,514,339 B2 | 12/2019 | Chen et al. | |
| D872,072 S | 1/2020 | Anderson | |
| 10,529,219 B2 | 1/2020 | Herdt et al. | |
| 10,762,617 B2 | 9/2020 | Sanders et al. | |
| 11,627,861 B2 | 4/2023 | Smith et al. | |
| 2005/0201898 A1 | 9/2005 | Borich et al. | |
| 2006/0222567 A1 | 10/2006 | Kloepfer et al. | |
| 2007/0181162 A1 | 8/2007 | Classen et al. | |
| 2008/0115807 A1 | 5/2008 | Gaus | |
| 2008/0267445 A1 | 10/2008 | Capewell | |
| 2009/0151751 A1 | 6/2009 | Bragg | |
| 2010/0205819 A1 | 8/2010 | Ashrafzadeh et al. | |
| 2011/0108073 A1 | 5/2011 | Tameishi | |
| 2011/0209729 A1 | 9/2011 | Beaudet et al. | |
| 2011/0240061 A1 | 10/2011 | Cantrell et al. | |
| 2011/0291830 A1 | 12/2011 | Kaiser | |
| 2011/0320133 A1 | 12/2011 | Mehus et al. | |
| 2012/0138092 A1 | 6/2012 | Ashrafzadeh et al. | |
| 2014/0041688 A1 | 2/2014 | Maennle et al. | |
| 2014/0041695 A1 | 2/2014 | Ellingson et al. | |
| 2014/0218385 A1 | 8/2014 | Carmi | |
| 2015/0233898 A1 | 8/2015 | Chen et al. | |
| 2016/0171690 A1 | 6/2016 | Adiri et al. | |
| 2017/0023542 A1 | 1/2017 | Wang et al. | |
| 2017/0119229 A1 | 5/2017 | Montgomery et al. | |
| 2017/0119232 A1 | 5/2017 | Ugel et al. | |
| 2018/0330338 A1 | 11/2018 | Holden et al. | |
| 2019/0244375 A1 | 8/2019 | Choi et al. | |
| 2019/0261828 A1 | 8/2019 | Gaus et al. | |
| 2019/0298143 A1 | 10/2019 | Haidacher et al. | |
| 2019/0365197 A1 | 12/2019 | Maddux | |
| 2020/0301382 A1 | 9/2020 | Fawaz et al. | |
| 2020/0397216 A1 | 12/2020 | Fawaz et al. | |
| 2021/0019874 A1 | 1/2021 | Sanders et al. | |
| 2021/0076898 A1 | 3/2021 | Smith et al. | |
| 2021/0127939 A1 | 5/2021 | Hofmann et al. | |
| 2021/0161355 A1 | 6/2021 | Rahn et al. | |
| 2021/0324561 A1 | 10/2021 | Kim et al. | |
| 2021/0369076 A1 | 12/2021 | McGinness et al. | |
| 2022/0095879 A1 | 3/2022 | Ellingson | |
| 2022/0104680 A1 | 4/2022 | Han et al. | |

FOREIGN PATENT DOCUMENTS

| | | |
|---|---|---|
| CN | 101460085 A | 6/2009 |
| CN | 101961237 A | 2/2011 |
| CN | 102933322 A | 2/2013 |
| CN | 106923767 A | 7/2017 |
| CN | 107485356 A | 12/2017 |
| CN | 107729816 A | 2/2018 |
| CN | 104668252 B | 1/2019 |
| CN | 109620078 A | 4/2019 |
| CN | 109936994 A | 6/2019 |
| CN | 110367898 A | 10/2019 |
| CN | 107421918 B | 12/2019 |
| CN | 111870205 A | 11/2020 |
| DE | 102005033345 A1 | 1/2007 |
| DE | 102008042290 A1 | 3/2010 |
| DE | 102010033016 A1 | 2/2012 |
| DE | 102018108775 A1 | 10/2019 |
| EP | 0341766 A2 | 11/1989 |
| EP | 1272093 A2 | 1/2003 |
| EP | 1690924 A1 | 8/2006 |
| EP | 1887443 A1 | 2/2008 |
| EP | 2497404 A1 | 9/2012 |
| EP | 3088593 A1 | 11/2016 |
| JP | 61280838 A | 12/1986 |
| JP | 02274289 A | 11/1990 |
| JP | 05115418 A | 5/1993 |
| JP | 0663279 A | 3/1994 |
| JP | 2000316783 A | 11/2000 |
| JP | 2002336335 A | 11/2002 |
| JP | 2003038888 A | 2/2003 |
| JP | 2003506153 A | 2/2003 |
| JP | 2004261439 A | 9/2004 |
| JP | 2005342143 A | 12/2005 |
| JP | 2009056030 A | 3/2009 |
| JP | 2009075084 A | 4/2009 |
| JP | 2010036023 A | 2/2010 |
| JP | 2015008914 A | 1/2015 |
| JP | 2015504708 A | 2/2015 |
| JP | 2016193169 A | 11/2016 |
| JP | 2018068862 A | 5/2018 |
| JP | 2018524107 A | 8/2018 |
| KR | 102019102134 A | 8/2019 |
| KR | 102119076 B1 | 6/2020 |
| WO | 9930843 A1 | 6/1999 |
| WO | 0110472 A1 | 2/2001 |
| WO | 0178573 A2 | 10/2001 |
| WO | 0213136 A2 | 2/2002 |
| WO | 2006002123 A1 | 1/2006 |
| WO | 2006097294 A1 | 9/2006 |
| WO | 2007081004 A1 | 7/2007 |
| WO | 2010118124 A2 | 10/2010 |
| WO | 2011048575 A2 | 4/2011 |
| WO | 2011089094 A1 | 7/2011 |
| WO | 2013090443 A1 | 6/2013 |
| WO | 2014137540 A1 | 9/2014 |
| WO | 2015036311 A1 | 3/2015 |
| WO | 2015080965 A1 | 6/2015 |
| WO | 2015127547 A1 | 9/2015 |
| WO | 2015167574 A1 | 11/2015 |
| WO | 2017013615 A1 | 1/2017 |
| WO | 2017056002 A1 | 4/2017 |

OTHER PUBLICATIONS

Notice of Allowance from U.S. Appl. No. 17/108,894, dated Jun. 27, 2024, 7 pp.
Response to Final Office Action dated Mar. 27, 2024 from U.S. Appl. No. 17/193,314, filed Jul. 12, 2024, 12 pp.
Response to Final Office Action dated Mar. 27, 2024 from U.S. Appl. No. 17/193,314, filed May 24, 2024, 10 pp.
Response to Office Action dated Apr. 26, 2024 from U.S. Appl. No. 18/185,194, filed Jul. 22, 2024, p. 16.
Final Office Action from U.S. Appl. No. 18/185,194 dated Nov. 12, 2024, 19 pp.
Response to Office Action dated Jul. 29, 2024, from counterpart Canadian Application No. 3,194,411 filed Nov. 6, 2024, 48 pp.

(56) References Cited

OTHER PUBLICATIONS

Translation of JPH0663279 by Ioku, published Mar. 8, 1994, JPH0663279 Previously Cited.

Notice of Allowance from U.S. Appl. No. 17/108,894, dated Sep. 27, 2024, 5 pp.

Final Office Action from U.S. Appl. No. 17/193,314 dated Mar. 27, 2024, 19 pp.

Office Action from U.S. Appl. No. 18/185,194 dated Apr. 26, 2024, 18 pp.

Response to Office Action dated Dec. 21, 2023 from U.S. Appl. No. 17/108,894, filed Mar. 21, 2024, 16 pp.

Final Office Action from U.S. Appl. No. 17/193,189 dated May 26, 2023, 32 pp.

Response to Final Office Action dated Apr. 5, 2023 from U.S. Appl. No. 17/108,894, filed Jun. 5, 2023, 12 pp.

Office Action from U.S. Appl. No. 17/108,894, dated Dec. 21, 2023, 8 pp.

Response to Office Action mailed Sep. 13, 2023, from U.S. Appl. No. 17/193,314, filed Dec. 13, 2023, 13 pp.

U.S. Appl. No. 18/398,859, filed Dec. 28, 2023, by McGinness et al.

Response to Communication Pursuant to Rules 161(1) and 162 EPC dated May 11, 2023, from counterpart European Application No. 21715050.7, filed Nov. 6, 2023, 18 pp.

Advisory Action from U.S. Appl. No. 17/108,894 dated Jun. 23, 2023, 3 pp.

Notice of Allowability from U.S. Appl. No. 17/108,894 dated Jul. 26, 2023, 8 pp.

Response to Office Action mailed May 26, 2023, from U.S. Appl. No. 17/193,189, filed Jul. 26, 2023, 14 pp.

Advisory Action from U.S. Appl. No. 17/193,189 dated Aug. 3, 2023, 3 pp.

DE102018108775 English translation, accessed on Sep. 2023. (Year: 2019).

Notice of Allowance from U.S. Appl. No. 17/193,189 dated Sep. 27, 2023, 14 pp.

Office Action from U.S. Appl. No. 17/193,314 dated Sep. 13, 2023, 21 pp.

Notice of Allowance from U.S. Appl. No. 17/108,894 dated Aug. 16, 2024, 5 pp.

Notice of Allowance from U.S. Appl. No. 17/193,314, dated Sep. 11, 2024, 10 pp.

Office Action from counterpart Canadian Application No. 3,194,411 dated Jul. 29, 2024, 3 pp.

"CDWA Cleaning Indicator—Cleaning Performance Test," Terragene, retrieved on Feb. 13, 2019, from https://fontlab2000.com/sites/default/files/cdwa-rev.15.pdf, 2 pp.

"NSF/ANSI 3—2017—Commercial Warewashing Equipment," NSF International, ANSI Standard, Apr. 11, 2017, 42 pp.

"Two-Class Logistic Regression," retrieved from https://docs.microsoft.com/en-us/azure/machine-learning/studio-module-reference/two-class-logistic-regression, May 6, 2019, 7 pp.

Powered for iPhone: Wireless Charging Stand for iPhone 8 and Above, Logitech POWERED iPhone Wireless Charging Standard, retrieved from https://www.logitech.com/en-us/productlpowered-iphone-wireless-charging?crid=1537 on Mar. 4, 2019, 10 pp.

Brownlee, "A Tour of Machine Learning Algorithms," machinelearningmastery.com, Aug. 14, 2020, 11 pp.

International Preliminary Report on Patentability from International Application No. PCT/US2021/021111 dated Apr. 13, 2023.

International Search Report and Written Opinion of International Application No. PCT/US2021/021111, mailed Jun. 8, 2021, 15 pp.

Kumar et al., "A Detailed Review of Feature Extraction in Image Processing Systems," 2014 Fourth International Conference on Advanced Computing & Communication Technologies, Feb. 8, 2014, 8 pp.

Machine Translation of CN 107729816 by Shan et al., published Feb. 23, 2018.

Narkhede, "Understanding AUC-ROC Curve," towardsdatascience.com, Jun. 26, 2018, 7 pp.

Narkhede, "Understanding Confusion Matrix," towardsdatascience.com, May 9, 2018, 6 pp.

Patel, "Machine Learning Algorithm Overview," medium.com, Jul. 21, 2018, 10 pp.

Prosecution History from U.S. Appl. No. 17/018,363, dated Dec. 16, 2021 through Mar. 16, 2023, 72 pp.

Prosecution History from U.S. Appl. No. 17/108,894, dated Jan. 12, 2021 through Apr. 5, 2023, 44 pp.

Prosecution History from U.S. Appl. No. 17/193,189, dated May 19, 2022 through Feb. 8, 2023, 56 pp.

Prosecution History from U.S. Appl. No. 17/193,507, dated Oct. 21, 2022 through Apr. 28, 2023, 39 pp.

Saslow, "Collinearity-What it Means, Why its Bad, and How Does it Affect Other Models," medium.com, Jul. 11, 2018, 5 pp.

Shung, "Accuracy, Precision, Recall or F1?," towardsdatascience.com, Mar. 15, 2018, 7 pp.

Singh, "Model-Based Feature Importance," towardsdatascience.com, Jan. 3, 2019, 7 pp.

U.S. Appl. No. 18/185,194, filed Mar. 16, 2023, naming inventors Smith et al.

Youtube, "Regularization Part 1: Ridge (L2) Regression," retrieved from https://www.youtube.com/watch?app=desktop&v=Q81RR3yKn30&t=3s, Sep. 24, 2018, 1 pp.

Youtube, "Regularization Part 2: Lasso (L1) Regression," Retrieved from https://www.youtube.com/watch?app=desktop&v=NGf0voTMIcs, Oct. 1, 2018, 1 pp.

Office Action from U.S. Appl. No. 18/398,859 dated Feb. 4, 2025, 25 pp.

Supplemental Notice of Allowance from U.S. Appl. No. 17/193,314 dated Dec. 27, 2024, 3 pp.

Translation of CN 110367898 by Liang, published Oct. 25, 2019. (CN 110367898 Previously Cited).

Notice of Allowance from U.S. Appl. No. 18/398,859 dated May 28, 2025, 14 pp.

Response to Office Action dated Feb. 4, 2025 from U.S. Appl. No. 18/398,859, filed May 2, 2025, 8 pp.

First Office Action and Search Report, and translation thereof, from counterpart Chinese Application No. 202180073243.6 dated Aug. 23, 2025, 16 pp.

Model Using Number of Plates as a Variable

| Std. Dev. | 0.219009442 | R² | 0.97663896 |
|---|---|---|---|
| Mean | 2.025285224 | Adjusted R² | 0.971595099 |
| C.V.% | 10.81375795 | Predicted R² | 0.965830084 |
| | | Adeq Precision | 50.09564045 |

| Term | Equation Coefficient | Sum of Squares | df | Mean Square | F-value | p-value |
|---|---|---|---|---|---|---|
| Intercept | -87.5604 | 176.46 | 19 | 9.287 | 193.6 | 2.5E-63 |
| A-Wash.Time | -0.0620971 | 39.79 | 1 | 39.790 | 829.6 | 1.4E-46 |
| C-Time.Between | -0.0772094 | 14.62 | 1 | 14.619 | 304.8 | 2.5E-30 |
| D-Tsump Os | 0.784019 | 43.65 | 1 | 43.648 | 910.0 | 3.5E-48 |
| E-Rinse.Time | -0.110947 | 5.10 | 1 | 5.100 | 106.3 | 8.3E-17 |
| F-Rinse.Temp | 0.192955 | 0.37 | 1 | 0.372 | 7.8 | 6.6E-03 |
| G-Plate.Nbr | 0.518249 | 2.79 | 1 | 2.785 | 58.1 | 2.7E-11 |
| H-Final.Cycle.Dwell | 0.0140212 | 1.41 | 1 | 1.412 | 29.4 | 5.0E-07 |
| AC | -0.000202558 | 0.20 | 1 | 0.199 | 4.1 | 0.044642 |
| AD | 0.000879338 | 2.13 | 1 | 2.128 | 44.4 | 2.3E-09 |
| AG | 0.0009902385 | 0.96 | 1 | 0.958 | 20.0 | 2.3E-05 |
| CE | -0.000985836 | 0.69 | 1 | 0.686 | 14.3 | 2.8E-04 |
| DF | -0.000628016 | 0.83 | 1 | 0.834 | 17.4 | 7.1E-05 |
| DG | -0.0034158 | 2.66 | 1 | 2.655 | 55.4 | 6.3E-11 |
| EF | 0.001012 | 1.61 | 1 | 1.606 | 33.5 | 1.1E-07 |
| EG | -0.00159512 | 0.42 | 1 | 0.423 | 8.8 | 0.003846 |
| A^2 | -0.000744814 | 5.31 | 1 | 5.306 | 110.6 | 3.1E-17 |
| C^2 | 0.00200427 | 4.94 | 1 | 4.945 | 103.1 | 1.7E-16 |
| D^2 | -0.00177653 | 2.02 | 1 | 2.023 | 42.2 | 4.8E-09 |
| F^2 | -0.000278395 | 0.30 | 1 | 0.297 | 6.2 | 0.014757 |
| Residual | | 4.22 | 88 | 0.048 | | |
| Cor Total | | 180.68 | 107 | | | |

FIG. 5

Model Using Sump Drop Temperature as a Variable

| Std. Dev. | 0.256194763 | $R^2$ | 0.968032623 |
|---|---|---|---|
| Mean | 2.025285224 | Adjusted $R^2$ | 0.961130576 |
| C.V.% | 12.64981147 | Predicted $R^2$ | 0.952979205 |
| | | Adeq Precision | 43.53076909 |

| Term | Equation Coefficient | Sum of Squares | df | Mean Square | F-value | p-value |
|---|---|---|---|---|---|---|
| Intercept | -25.395 | 174.91 | 19 | 9.206 | 140.3 | 2.3E-57 |
| A-Wash.Time | 0.153593 | 17.71 | 1 | 17.708 | 269.8 | 1.5E-28 |
| C-Tsump 0s | 0.15981 | 47.59 | 1 | 47.594 | 725.1 | 2.9E-44 |
| D-Time.Between | -0.872655 | 0.27 | 1 | 0.267 | 4.1 | 0.0465972 |
| E-Rinse.Time | -0.47753 | 9.35 | 1 | 9.346 | 142.4 | 4.3E-20 |
| F-Rinse.Temp | 0.000774436 | 5.20 | 1 | 5.195 | 79.2 | 6.7E-14 |
| H-Final.Cycle.Dwell | 0.01406 | 1.42 | 1 | 1.420 | 21.6 | 1.2E-05 |
| K-Tsump 0-7s | 1.71641 | 1.17 | 1 | 1.173 | 17.9 | 5.8E-05 |
| AD | -0.00045403 | 0.99 | 1 | 0.990 | 15.1 | 2.0E-04 |
| AE | -0.00082825 | 1.11 | 1 | 1.115 | 17.0 | 8.5E-05 |
| AF | -0.00034166 | 1.09 | 1 | 1.093 | 16.6 | 9.9E-05 |
| CD | 0.00461076 | 5.94 | 1 | 5.936 | 90.4 | 3.7E-15 |
| CE | 0.00164027 | 0.68 | 1 | 0.685 | 10.4 | 0.0017417 |
| CK | -0.0120958 | 3.31 | 1 | 3.312 | 50.5 | 3.0E-10 |
| DE | -0.00094592 | 0.62 | 1 | 0.620 | 9.4 | 0.0028127 |
| DF | 0.000510532 | 1.01 | 1 | 1.007 | 15.3 | 1.8E-04 |
| EF | 0.00175482 | 4.03 | 1 | 4.034 | 61.5 | 9.8E-12 |
| A^2 | -0.00070117 | 4.90 | 1 | 4.904 | 74.7 | 2.2E-13 |
| D^2 | 0.00127919 | 1.59 | 1 | 1.593 | 24.3 | 3.9E-06 |
| K^2 | 0.0102151 | 1.05 | 1 | 1.052 | 16.0 | 1.3E-04 |
| Residual | | 5.78 | 88 | 0.066 | | |
| Cor Total | | 180.68 | 107 | | | |

FIG. 6

| 270 | |
|---|---|
| A - Wash.Time | 30 |
| B - Tsump 0s | 168 |
| C - Time.Between | 1 |
| D - Rinse.Time | 7.5 |
| E - Rinse.Temp | 180 |
| F - Plate.Nbr | 5 |
| G - Final.Cycle.Dwell | 10 |
| H - TSump 7s | 160 |
| 749 HUEs | |

↑ INCREASE WASH TIME

| 272 | |
|---|---|
| A - Wash.Time | 60 |
| B - Tsump 0s | 168 |
| C - Time.Between | 1 |
| D - Rinse.Time | 7.5 |
| E - Rinse.Temp | 180 |
| F - Plate.Nbr | 5 |
| G - Final.Cycle.Dwell | 10 |
| H - TSump 7s | 160 |
| 3589 HUEs | |

↑ INCREASE RINSE TEMP AND TIME

| 274 | |
|---|---|
| A - Wash.Time | 30 |
| B - Tsump 0s | 168 |
| C - Time.Between | 1 |
| D - Rinse.Time | 17.5 |
| E - Rinse.Temp | 190 |
| F - Plate.Nbr | 5 |
| G - Final.Cycle.Dwell | 10 |
| H - TSump 7s | 160 |
| 3711 HUEs | |

CONDITIONS AT 7 SECONDS

FIG. 7

| | 276 |
|---|---|
| A - Wash.Time | 43 |
| B - Tsump 0s | 168 |
| C - Time.Between | 1 |
| D - Rinse.Time | 7.5 |
| E - Rinse.Temp | 175 |
| F - Plate.Nbr | 16 |
| G - Final.Cycle.Dwell | 10 |
| H - TSump 7s | 160 |
| 1107 HUEs | |

INCREASE WASH TIME, INCREASE RINSE TIME AND TEMP

| | 278 |
|---|---|
| A - Wash.Time | 55 |
| B - Tsump 0s | 168 |
| C - Time.Between | 1 |
| D - Rinse.Time | 12 |
| E - Rinse.Temp | 185 |
| F - Plate.Nbr | 16 |
| G - Final.Cycle.Dwell | 10 |
| H - TSump 7s | 160 |
| 3724 HUEs | |

CONDITIONS AT 7 SECONDS

| | |
|---|---|
| A - Wash.Time | 30 |
| B - Tsump 0s | 168 |
| C - Time.Between | 1 |
| D - Rinse.Time | 7.5 |
| E - Rinse.Temp | 180 |
| F - Plate.Nbr | 16 |
| G - Final.Cycle.Dwell | 10 |
| H - TSump 7s | 155 |
| 240 HUEs | |

→ INCREASE WASH TIME, INCREASE RINSE TIME AND TEMP

282

| | |
|---|---|
| A - Wash.Time | 43 |
| B - Tsump 0s | 168 |
| C - Time.Between | 1 |
| D - Rinse.Time | 21 |
| E - Rinse.Temp | 185 |
| F - Plate.Nbr | 16 |
| G - Final.Cycle.Dwell | 10 |
| H - TSump 7s | 155 |
| 3694 HUEs | |

→ INCREASE RINSE TIME AND TEMP

284

| | |
|---|---|
| A - Wash.Time | 30 |
| B - Tsump 0s | 168 |
| C - Time.Between | 1 |
| D - Rinse.Time | 31.5 |
| E - Rinse.Temp | 185 |
| F - Plate.Nbr | 16 |
| G - Final.Cycle.Dwell | 10 |
| H - TSump 7s | 155 |
| 3633 HUEs | |

CONDITIONS AT 7 SECONDS

FIG. 9

FIG. 10 CONDITIONS AT 7 SECONDS

Table 286:

| | |
|---|---|
| A - Wash.Time | 43 |
| B - Tsump 0s | 170 |
| C - Time.Between | 1 |
| D - Rinse.Time | 15 |
| E - Rinse.Temp | 185 |
| F - Plate.Nbr | 5 |
| G - Final.Cycle.Dwell | 10 |
| H - TSump 7s | 165 |
| 15001 HUEs | |

→ DECREASE WASH TIME →

Table 288:

| | |
|---|---|
| A - Wash.Time | 27 |
| B - Tsump 0s | 170 |
| C - Time.Between | 1 |
| D - Rinse.Time | 15 |
| E - Rinse.Temp | 185 |
| F - Plate.Nbr | 5 |
| G - Final.Cycle.Dwell | 10 |
| H - TSump 7s | 165 |
| 3616 HUEs | |

→ DECREASE WASH TIME, DECREASE RINSE TIME AND TEMP →

Table 290:

| | |
|---|---|
| A - Wash.Time | 30 |
| B - Tsump 0s | 170 |
| C - Time.Between | 1 |
| D - Rinse.Time | 12.5 |
| E - Rinse.Temp | 172 |
| F - Plate.Nbr | 5 |
| G - Final.Cycle.Dwell | 10 |
| H - TSump 7s | 165 |
| 3593 HUEs | |

MONITORING AND CONTROL OF THERMAL SANITIZATION IN AUTOMATED CLEANING MACHINES

This application is a continuation of U.S. patent application Ser. No. 17/193,507, filed Mar. 5, 2021, which claims the benefit of U.S. Provisional Application No. 63/086,744, titled, "MONITORING AND CONTROL OF THERMAL SANITIZATION IN AUTOMATED CLEANING MACHINES", filed Oct. 2, 2020, the entire content of each of which is incorporated herein by reference.

BACKGROUND

Automated cleaning machines are used in restaurants, healthcare facilities, and other locations to clean, disinfect, and/or sanitize various articles. In a restaurant or food processing facility, automated cleaning machines (e.g., ware wash machines or dish machines) may be used to clean food preparation and eating articles, such as dishware, glassware, pots, pans, utensils, food processing equipment, and other items. In general, articles to be cleaned are placed on a rack and provided to a wash chamber of the automated cleaning machine. In the chamber, one or more cleaning products and/or rinse agents are applied to the articles during a cleaning process. The cleaning process may include one or more wash phases and one or more rinse phases. At the end of the cleaning process, the rack is removed from the wash chamber. Water temperature, water pressure, water quality, concentration of the chemical cleaning and/or rinse agents, duration of the wash and/or rinse phases and other factors may impact the efficacy of a cleaning process.

SUMMARY

In general, the disclosure is directed to systems and/or methods of monitoring and/or controlling thermal sanitization in automated cleaning machines. For example, the systems and/or methods in accordance with the present disclosure may include automated dish machines in which one or more cleaning process parameters are monitored and/or controlled to achieve thermal sanitization of wares. In accordance with the techniques of the present disclosure, it has been determined that a sump temperature drop (i.e., a decrease in temperature of the fluid in the sump) at or near the beginning of the cleaning process is indicative of how certain other cleaning process parameters, such as wash time, rinse time, rinse temperature, may be adjusted in order to achieve thermal sanitization of the wares.

In one example, the disclosure is directed to an automated cleaning machine comprising a housing defining a wash chamber in which articles to be cleaned are subjected to a cleaning process; a sump configured to receive and store a cleaning solution; at least one processor; at least one storage device that stores default cleaning process parameters including one or more of a wash time, a rinse temperature, and a rinse time; the at least one storage device further comprising instructions executable by the at least one processor to: control execution by the cleaning machine of at least an initial portion of the cleaning process using the default cleaning process parameters; determine a first temperature of the cleaning solution in the sump at a first predetermined time during execution of the cleaning process; determine a second temperature of the cleaning solution in the sump at a second predetermined time during execution of the cleaning process, wherein the second predetermined time is subsequent to the first predetermined time; determine a sump temperature difference between the first temperature and the second temperature; predict a number of heat unit equivalents (HUEs) that will be delivered during the cleaning process based on the sump temperature difference; in response to the predicted number of heat unit equivalents not satisfying a target range indicative of thermal sanitization, adjust one or more of the cleaning process parameters such that a revised predicted number of HUEs that will be delivered during the cleaning process based on the sump temperature difference satisfies the target range indicative of thermal sanitization; and control execution of a remaining portion of the cleaning process using the one or more adjusted cleaning process parameters.

The at least one storage device may further comprise instructions executable by the at least one processor to predict a number of HUEs that will be delivered during the cleaning process based on the sump temperature difference, the wash time, the rinse temperature, and the rinse time. The one or more adjusted cleaning process parameters may include the wash time, the rinse time, and/or the rinse temperature.

The at least one storage device may further comprise instructions executable by the at least one processor to predict a number of HUEs that will be delivered during the cleaning process based on a predictive equation that includes the sump temperature difference as a variable modeled from experimental data that is statistically correlated with a predictive equation that includes a number of articles in the wash chamber of the cleaning machine during the cleaning process modeled from the experimental data. The target range indicative of thermal sanitization includes a minimum target of 3600 HUEs, or may include a range between 3600 HUEs and 3700 HUEs.

The cleaning process may include a current cleaning process, and the at least one storage device may further comprise instructions executable by the at least one processor to: determine a machine idle time measured from completion of a previous cleaning process to initiation of the current cleaning process; adjust one or more of the cleaning process parameters such that the revised predicted number of HUEs that will be delivered during the cleaning process based on the sump temperature difference and the machine idle time satisfies the target range indicative of thermal sanitization; and control execution of a remaining portion of the cleaning process using the one or more adjusted cleaning process parameters.

In another example, the disclosure is directed to a method comprising controlling execution of a cleaning process by a cleaning machine of at least an initial portion of the cleaning process using default cleaning process parameters, the cleaning process including delivering a cleaning solution from a sump associated with the cleaning machine into a wash chamber of the cleaning machine into which articles to be cleaned are present; determining a first temperature of the cleaning solution in the sump at a first predetermined time during execution of the cleaning process; determining a second temperature of the cleaning solution in the sump at a second predetermined time during execution of the cleaning process, wherein the second predetermined time is subsequent to the first predetermined time; determining a sump temperature difference between the first temperature and the second temperature; predicting a number of heat unit equivalents (HUEs) that will be delivered to the wash chamber of the cleaning machine during the cleaning process based on the sump temperature difference; in response to the predicted number of heat unit equivalents not satisfying a target range indicative of thermal sanitization, adjusting one or more of the cleaning process parameters such that a revised predicted number of HUEs that will be delivered during the cleaning process based on the sump temperature difference satisfies the target range indicative of thermal sanitization; and controlling execution of a remaining portion of the cleaning process using the one or more adjusted cleaning process parameters.

The method may further including predicting a number of HUEs that will be delivered during the cleaning process based on the sump temperature difference, the wash time, the rinse temperature, and the rinse time. The one or more adjusted cleaning process parameters may include the wash time, the rinse time, and/or the rinse temperature.

The method may further include predicting a number of HUEs that will be delivered during the cleaning process based on a predictive equation that includes the sump temperature difference as a variable modeled from experimental data that is statistically correlated with a predictive equation that includes a number of articles in the wash chamber of the cleaning machine during the cleaning process modeled from the experimental data. The target range indicative of thermal sanitization includes a minimum target of 3600 HUEs, or may include a range between 3600 HUEs and 3700 HUEs.

The cleaning process may include a current cleaning process, and the method may further include determining a machine idle time measured from completion of a previous cleaning process to initiation of the current cleaning process; adjusting one or more of the cleaning process parameters such that the revised predicted number of HUEs that will be delivered during the cleaning process based on the sump temperature difference and the machine idle time satisfies the target range indicative of thermal sanitization; and controlling execution of a remaining portion of the cleaning process using the one or more adjusted cleaning process parameters.

In another example, the disclosure is directed to a non-volatile computer-readable storage medium comprising instructions that, when executed by a processor, configure the processor to: control execution by a cleaning machine of at least an initial portion of a cleaning process using default cleaning process parameters; determine a first temperature of a cleaning solution in a sump of the cleaning machine at a first predetermined time during execution of the cleaning process; determine a second temperature of the cleaning solution in the sump of the cleaning machine at a second predetermined time during execution of the cleaning process, wherein the second predetermined time is subsequent to the first predetermined time; determine a sump temperature difference between the first temperature and the second temperature; predict a number of heat unit equivalents (HUEs) that will be delivered during the cleaning process based on the sump temperature difference; in response to the predicted number of heat unit equivalents not satisfying a target range indicative of thermal sanitization, adjust one or more of the cleaning process parameters such that a revised predicted number of HUEs that will be delivered during the cleaning process based on the sump temperature difference satisfies the target range indicative of thermal sanitization; and control execution of a remaining portion of the cleaning process using the one or more adjusted cleaning process parameters.

The details of one or more examples are set forth in the accompanying drawings and the description below. Other features will be apparent from the description and drawings, and from the claims.

BRIEF DESCRIPTION OF DRAWINGS

FIG. 5 is a table showing statistical analysis of results of designed experiments using a number of plates washed during a cleaning process as a variable in accordance with the present disclosure.

FIG. 6 is a table showing statistical analysis of results of designed experiments using a sump temperature difference during the first 7 seconds of a cleaning process as a variable in accordance with the present disclosure.

FIGS. 7-10 show examples of how one or more cleaning process parameters may be adjusted to achieve thermal sanitization of wares subjected to a cleaning process in a dish machine based on a sump temperature difference experienced during the first 7 seconds of a wash phase portion of the cleaning process in accordance with the present disclosure.

DETAILED DESCRIPTION

Figure 1:
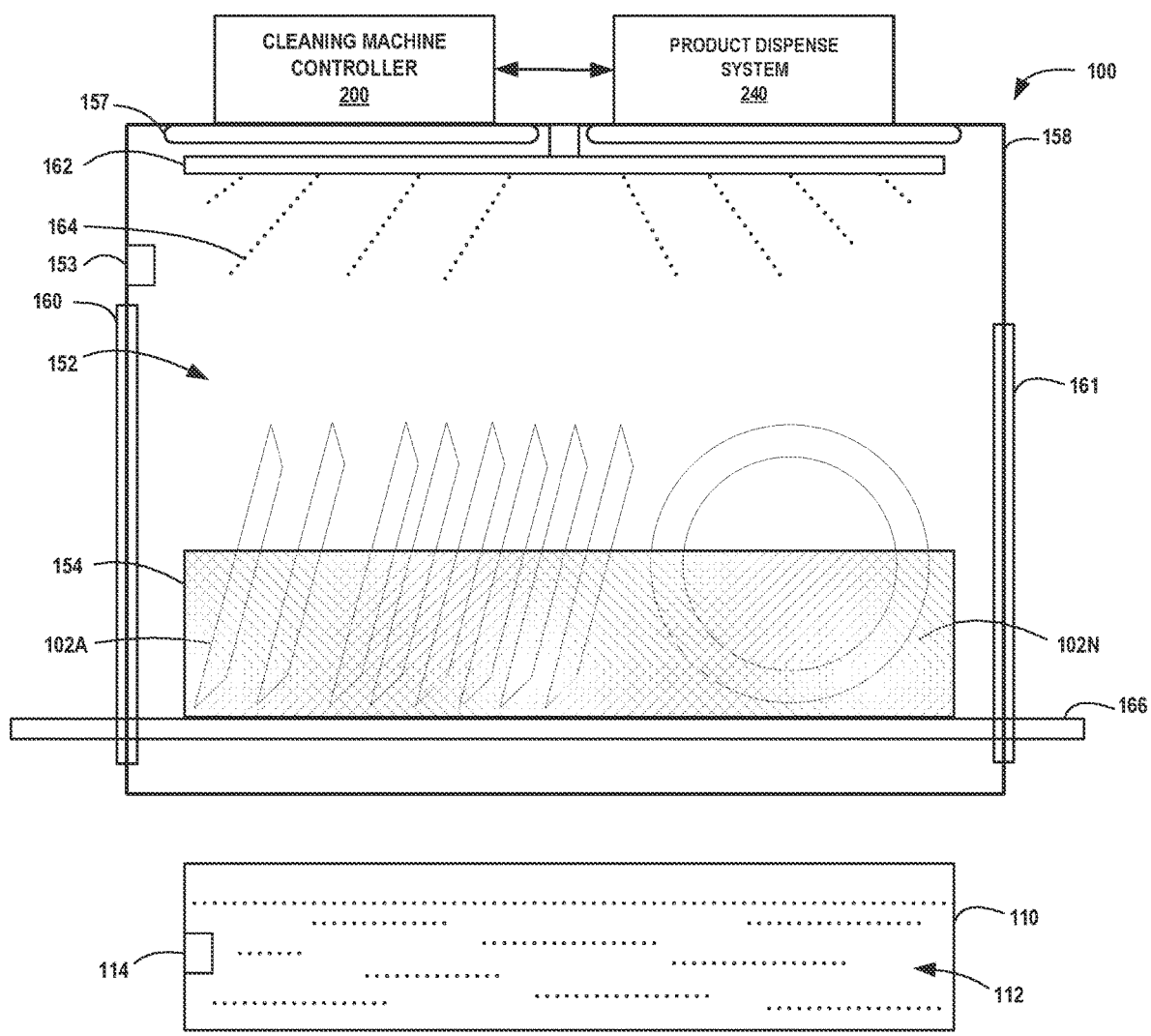
FIG. 1 shows an example automated cleaning machine in which one or more cleaning process parameters are controlled based on a sump temperature difference so as to achieve thermal sanitization of wares in accordance with the present disclosure.

In general, the disclosure is directed to systems and/or methods of monitoring and/or controlling thermal sanitization in automated cleaning machines. For example, the systems and/or methods in accordance with the present disclosure may include automated dish machines in which one or more cleaning process parameters are monitored and/or controlled to achieve thermal sanitization of wares. In accordance with the techniques of the present disclosure, it has been determined that a sump temperature difference (i.e., a decrease in temperature of the cleaning solution in the sump) experienced at or near the beginning of the cleaning process is indicative of how certain other cleaning process parameters, such as wash time, rinse time, and/or rinse temperature, may be adjusted in order to achieve thermal sanitization of the wares subjected to the cleaning process.

NSF International Standard 3-2017 requires commercial dish machines to deliver a minimum of 3600 Heat Unit Equivalents (HUEs) to achieve thermal sanitization. The cleaning process parameters, such as wash water temperature (set point and actual), wash time, rinse water temperature (set point and actual), rinse time, after cycle dwell time, time between cycles, etc., necessary to achieve thermal sanitization of wares in a dish machine may be dependent upon several factors. These factors may include the ware type (e.g., plates, cups, silverware, pots and pans, etc.), the ware material (e.g., ceramic, glass, metal, plastic, etc.), and the number or amount of wares to be cleaned (i.e., the relative "fullness" of the rack(s) in the cleaning chamber of the cleaning machine). In general, for example, the more wares to be cleaned, the more heat energy that must be delivered by the dish machine in order to achieve thermal sanitization of the wares. As another example, different ware materials have different thermal properties, which affect the amount of heat energy that must be delivered by a dish machine to achieve thermal sanitization of the ware. As another example, the shape of the ware (e.g., plate, cup, utensil, etc.) can also affect thermal sanitization. These factors may affect the temperature profile of the wash water (e.g., the temperature of the water or cleaning solution in the dish machine sump) over the course of the cleaning cycle, which can further affect the amount of heat energy delivered to the wares.

In accordance with the present disclosure, it has been determined that a sump temperature difference experienced during a predetermined time period (e.g., the difference in the sump temperature from a first point in time to a second point in time) at or near the beginning of the wash phase portion of the cleaning process is indicative of how certain other cleaning process parameters, such as wash time, rinse time, and/or rinse temperature, may be adjusted in order to achieve thermal sanitization of the wares subjected to the cleaning process. In this way, one or more cleaning process parameters may be controlled based on a sump temperature difference so as to achieve thermal sanitization of wares subjected to a cleaning process in a cleaning machine, independent of the ware type, the ware material, and/or the number or amount of wares to be cleaned.

FIG. 1 shows an example automated cleaning machine 100 in which one or more cleaning process parameters are controlled based on a sump temperature difference experienced during a predetermined time period at or near the beginning of a cleaning process so as to achieve thermal sanitization of wares in accordance with the present disclosure. In this example, cleaning machine 100 is a ware wash or dishmachine for cleaning and/or sanitizing eating and/or food preparation articles 102A-102N. In this example, articles 102A-102N are plates. It shall be understood, however, that articles 102A-102N may also include other eating or food preparation articles such as bowls, coffee cups, glassware, silverware, cooking utensils, pots and pans, etc. It shall further be understood that cleaning machine 100 may include any other type of cleaning machine such as clothes or textile washing machines, medical instrument re-processors, automated washer disinfectors, autoclaves, sterilizers, or any other type of cleaning machine, and that the disclosure is not limited with respect to the type of cleaning machine or to the types of articles to be cleaned.

Example cleaning machine 100 is a door or conveyor-type commercial dish machine having a sump 110 from which a cleaning solution 112 is recirculated during one or more cleaning cycles. Example cleaning machine 100 includes an enclosure 158 defining one or more wash chamber(s) 152 and having one or more door(s) 160, 161 that permit entry and/or exit into wash chamber 152. One or more removable rack(s) 154 are sized to fit inside wash chamber 152. Each rack 154 may be configured to receive articles to be cleaned directly thereon, or they may be configured to receive one or more trays or holders into which articles to be cleaned are held during the cleaning process. The racks 154 may be general or special-purpose racks, and may be configured to hold large and/or small items, food processing/preparation equipment such as pots, pans, cooking utensils, etc., and/or glassware, dishes and other eating utensils, etc. In a hospital or healthcare application, the racks may be configured to hold instrument trays, hardgoods, medical devices, tubing, masks, basins, bowls, bed pans, or other medical items. It shall be understood that the configuration of racks 154, and the description of the items that may be placed on or in racks 154, as shown and described with respect to FIG. 1 and throughout this specification, are for example purposes only, and that the disclosure is not limited in this respect.

A typical cleaning machine such as cleaning machine 100 operates by pumping cleaning solution 112 from sump 110 and spraying the cleaning solution(s) 164 (a mixture of water and one or more chemical cleaning products) into wash chamber 152 and thus onto the articles to be cleaned. Wash water temperature of the cleaning solution 112 is maintained with a heater in the sump. The cleaning solution(s) 112 are pumped from sump 110 to one or more spray arms 162, which spray the cleaning solution(s) 164 into wash chamber 152 at appropriate times. The used cleaning solution is drained into sump 110, and fresh rinse water is sprayed into the wash chamber and onto the wares. The rinse water is drained into sump 110, which holds the used wash and/or rinse solution 112 to be reused in the next cleaning cycle. Cleaning machine 100 may also include or be provided with a chemical product dispenser 240 that automatically dispenses the appropriate chemical product(s) at the appropriate time(s) during the cleaning process, mixes them with the diluent, and distributes the resulting cleaning solution(s) 164 to the cleaning machine 100 to be dispensed into the wash chamber 152. Depending upon the machine, the articles to be cleaned, the amount of soil on the articles to be cleaned, and other factors, one or more wash phases may be interspersed with one or more rinse phases and/or sanitization phases to form one complete cleaning process of cleaning machine 100.

Automated cleaning machine 100 further includes a cleaning machine controller 200. Controller 200 includes one or more processor(s) that monitor and control various cleaning process parameters of the cleaning machine 100 such as wash and rinse phase time(s), sequence(s), and duration(s), cleaning solution concentrations, timing for dispensation of one or more chemical products, amounts of chemical products to be dispensed, wash and/or rinse phase water temperature set point(s), timing for application of water and chemical products into the wash chamber, etc. Controller 200 may communicate with a product dispense system 240 in order to monitor and/or control the timing and/or amounts of cleaning products dispensed into cleaning machine 100 or mixed with a diluent to form cleaning solution 164.

In some examples, cleaning machine controller 200 and/or product dispense system 240 may be configured to communicate with one or more remote computing devices or cloud-based server computing systems. Cleaning machine controller 200 and/or product dispense system 240 may also be configured to communicate, either directly or remotely, with one or more user computing devices, such as tablet computers, mobile computing devices, smart phones, laptop computers.

As shown in FIG. 1, one or more articles to be cleaned, such as plates 102A-102N, may be placed on rack 154 and moved into the wash chamber 152 at the start of a cleaning process. Rack 154 may be moved on a conveyor 166 or other supporting structure.

The cleaning process parameters may also be customized based on the article type being cleaned for each individual rack. The cleaning process parameters may be directed to the type(s) of soils typically encountered when cleaning each article type. For example, pots and pans may be soiled with large amounts of baked or cooked on starch, sugar, protein, and fatty soils. In contrast, drinking glasses or cups are not typically heavily soiled but have hard to remove soils like lipstick, coffee and tea stains. In some examples, system controller 200 may include one or more user-selectable default cleaning cycles based on the ware type, such as a normal cycle, a glassware cycle, a pot/pan cycle, each with associated default cleaning process parameters aimed at effectively cleaning and sanitizing the wares to be cleaned.

In some examples, the cleaning machine 100 may include one or more sensors that provide information about various parameters of the cleaning cycle. For example, cleaning machine 100 may include one or more temperature sensor(s), such as temperature sensor 153, that measure temperature(s) inside wash chamber 152. In the example of FIG. 1, temperature sensor 153 is positioned on a sidewall inside wash chamber 152 of cleaning machine 100; however, it shall be understood that one or more temperature sensors may be placed at any appropriate position(s) within the wash chamber 152 where relevant temperature information may be obtained. The cleaning machine 100 may further include one or more sump temperature sensor(s) 114 that measures a temperature of a cleaning solution 112 (the "sump temperature") in sump 110. For example, cleaning machine controller 200 may sample and store sump temperature data measured by sensor 114 continuously over the course of the cleaning cycle, at periodic intervals over the course of the cleaning cycle, and/or at predetermined times during the cleaning cycle. The cleaning machine controller 200 may analyze the sump temperature data to identify the sump temperature at any particular point in time, determine an absolute change in the sump temperature during a predetermined period of time (increase or decrease from any one point in time to another) and/or a rate of change in the sump temperature (e.g., the slope or the derivative of the temperature vs. time curve at any given point) during the cleaning cycle. Controller 200 may analyze the sump temperature(s) at one or more points in time, the difference in the sump temperature from one point in time to another point in time, and/or the rate of change in sump temperature at any given point(s) in time, either alone or in conjunction with other data pertaining to the cleaning process. Controller 200 may automatically and/or dynamically adjust one or more cleaning process parameters to achieve thermal sanitization of the wares subjected to the cleaning process based on the analysis. In addition or alternatively, the cleaning machine controller may implement any adjustments to the cleaning process parameters in one or more subsequent cleaning cycles.

The controller 200 may also analyze an accumulated heat energy (determined based on one or more measured temperatures during the cleaning cycle and one or more the cycle time(s) or durations) during the cleaning cycle and compare to a sanitization threshold to determine whether the accumulated heat energy was sufficient to achieve adequate sanitization of the wares during the cleaning cycle. If the accumulated heat energy does not satisfy the sanitization threshold, controller 200 may extend the wash and/or rinse phases or add additional wash and/or rinse phases to achieve a heat energy level that satisfies the sanitization threshold. Alternatively, the extended wash and/or rinse phases or additional wash and/or rinse phases may be implemented in the next cleaning cycle.

In this way, the techniques of the present disclosure may help to achieve thermal sanitization of wares subjected to a cleaning process through adjustment of one or more cleaning process parameters based on a sump temperature difference experienced during a predetermined period of time at or near the beginning of the cleaning process. Because in accordance with the present disclosure the sump temperature difference has been determined to be correlated with both the ware type, the ware material, and/or the number or amount of wares present in a dish machine, the techniques of the present disclosure may help to ensure thermal sanitization of the wares independent of the ware type, the ware material, and/or the number of amount of wares in the cleaning machine. The number of HUEs delivered for the duration of the cleaning process may be predicted, and, if the predicted HUEs delivered does not satisfy a target number of HUEs required for thermal sanitization, one or more cleaning process parameters may be adjusted to ensure that the target number of HUEs will be met. The techniques of the present disclosure may also result in increased efficiency in terms of energy and/or cost due to the tailoring of the cleaning process parameters for each individual cleaning cycle to achieve, but not significantly exceed, requirements for thermal sanitization.

In some examples, cleaning machine controller 200, or a remote computing system (see, e.g., FIG. 2) may generate one or more reports or notifications regarding the temperature data sensed by any of sensors 153 and/or 114, measured sump temperatures, measured sump temperature difference(s), and/or any other cleaning process parameters measured or determined over the course of the cleaning cycle(s). For example, controller 200 may generate, based on cleaning machine data generated during the cleaning cycle, a notification for display, such as display on a user computing device, that includes cleaning process parameters associated with the cleaning cycle, data monitored during the cleaning cycle or data generated based on analysis of the data monitored before, during, or after the cleaning cycle, and/or any information associated with the cleaning cycle(s) run by one or more cleaning machines. The displayed data may further include one or more graphs or charts of the data monitored or generated with respect to the cleaning cycle(s).

Figure 2:
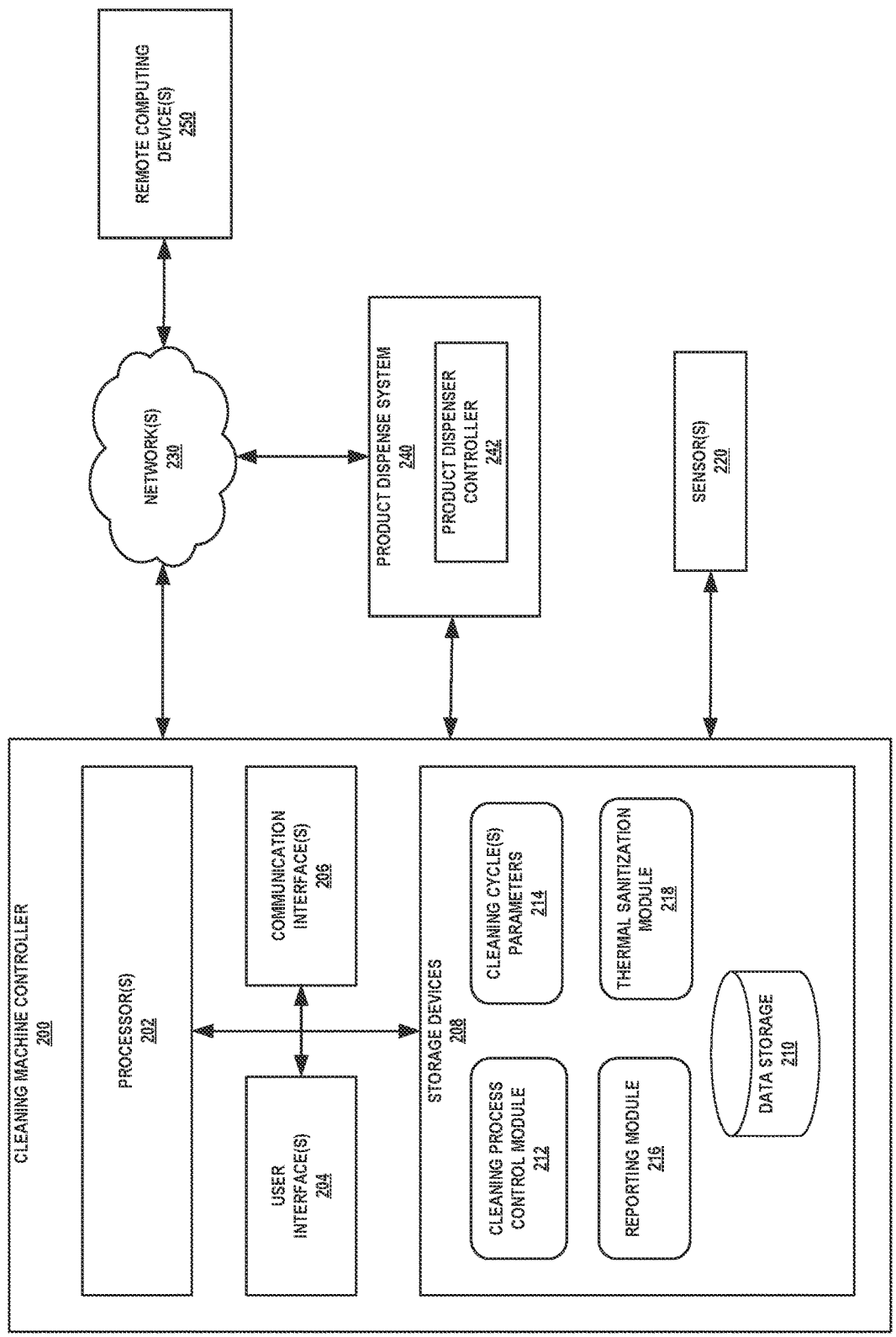
FIG. 2 is a block diagram of an example system that controls one or more cleaning process parameters of an automated cleaning machine based on a sump temperature difference so as to achieve thermal sanitization of wares in accordance with the present disclosure.

FIG. 2 is a block diagram of an example system 260 that controls one or more cleaning process parameters of an automated cleaning machine based on a sump temperature difference so as to achieve thermal sanitization of wares in accordance with the present disclosure. System 260 includes a cleaning machine controller 200, one or more sensor(s) 220, a product dispense system (240) and one or more local or remote computing device(s) 250. Cleaning machine controller 200 is a computing device that includes one or more processors 202, one or more user interface components 204, one or more communication components 206, and one or more data storage components 208. User interface components 204 may include one or more of an audio interface(s), a visual interface(s), and touch-based interface components, including a touch-sensitive screen, display, speakers, buttons, keypad, stylus, mouse, or other mechanism that allows a user to interact with a computing device. Communication components 206 allow controller 200 to communicate with other electronic devices, such as a product dispenser controller 242 and/or other remote or local computing devices 250. The communication may be accomplished through wired and/or wireless communications, as indicated generally by network(s) 230.

Controller 200 includes one or more storage device(s) 208 that include a cleaning process control module 212, cleaning process parameters 214, an analysis/reporting module 216 and data storage 210. Modules 212 and 216 may perform operations described using software, hardware, firmware, or a mixture of hardware, software, and firmware residing in and/or executing at controller 200. Controller 200 may execute modules 212 and 216 with one or more processors 202. Controller 200 may execute modules 212 and 216 as a virtual machine executing on underlying hardware. Modules 212 and 216 may execute as a service or component of an operating system or computing platform, such as by one or more remote computing devices 250. Modules 212 and 216 may execute as one or more executable programs at an application layer of a computing platform. In some examples, user interface 204 and/or modules 212 and 216 may be arranged remotely to and/or configured for remote communication with controller 200, such as operating at one or more of local computing device(s) 250 that manage cleaning processes in one or more cleaning machines at a location, or as one or more network services operating in a network cloud-based computing system that manage cleaning processes in one or more cleaning machines at multiple locations provided by one or more of remote computing devices 250.

Cleaning process parameters 214 may include one or more sets of default cleaning process parameters, for example, wash and rinse phase timing and sequencing, wash and rinse water temperatures, sump temperatures, wash and rinse water conductivities, wash phase duration, rinse phase duration, dwell time duration, wash and rinse water pH, detergent concentration, rinse agent concentration, humidity, water hardness, turbidity, rack temperatures, mechanical action within the cleaning machine, and any other cleaning cycle parameter that may influence the efficacy of the cleaning process. The values for the cleaning process parameters may be different depending upon the type of machine, for example, door type machines and conveyor type machines may have different sets of default cleaning process parameters. In addition, the values for the default cleaning process parameters 214 may be different depending upon the type of wares to be cleaned or a user-selectable setting of the dish machine. For example, different default cleaning process parameters may be associated with a regular cleaning cycle, a heavy duty cleaning cycle, a pot/pan cleaning cycle, etc.

Cleaning process control module 212 includes instructions that are executable by processor(s) 202 to perform various tasks. For example, cleaning process control module 212 includes instructions that are executable by processor(s) 202 to initiate, monitor and/or control one or more cleaning cycles in a cleaning machine in accordance with the present disclosure. Thermal sanitization module 218 includes instructions that are executable by processor(s) 202 to monitor and/or adjust one or more cleaning process parameters of the cleaning machine based on a sump temperature difference experienced during a predetermined time period at or near the beginning of the cleaning cycle so as to achieve thermal sanitization of wares in accordance with the present disclosure. In some examples, cleaning process control module 212 and thermal sanitization module 218 cooperate to dynamically adjust one or more cleaning process parameters during the current cleaning process so as to achieve thermal sanitization of the wares subjected to the cleaning process. In some examples, in addition or alternatively, the adjusted cleaning process parameters may be implemented in one or more subsequent cleaning cycles. The adjusted cleaning process parameters may be stored in data storage 210 for use during the cleaning cycle, and may also be stored in a cycle data record including any data associated with the cleaning cycle.

In accordance with the present disclosure, thermal sanitization module 218 may further include instructions executable by the processor(s) 202 to determine the heat energy accumulated over the course of a cleaning cycle to determine whether adequate sanitization of articles subjected to the cleaning cycle has been achieved, and to further control one or more wash cycle parameters based on the result. For example, an extended wash phase, an extended rinse phase, or additional wash and/or rinse phase(s) may be dynamically applied during the current cleaning cycle. In a more specific example, if the heat energy accumulated during the course of the cleaning process is insufficient to achieve adequate sanitization of the articles, thermal sanitization module 212 may determine an extended rinse phase duration needed in order to adequately sanitize the article(s) in the cleaning machine. Controller 200 may then control the cleaning machine to automatically execute the extended rinse phase of the determined duration. In this example, the rinse phase duration may be extended because the controller 200 determines, by execution of thermal sanitization module 218, that application of additional rinse water during an extended rinse phase will accomplish the additional heat transfer necessary to satisfy the sanitization threshold. In this way, thermal sanitization module 218 may dynamically control the duration of the rinse phase based on a calculated amount of heat energy accumulated over the duration of a cleaning cycle to ensure that an adequate sanitization result is achieved. In other examples, an extended wash phase, an extended rinse phase, or additional wash and/or rinse phase(s) may be added during the next or any subsequent cleaning cycle rather than dynamically applied during the current cleaning cycle.

In accordance with the present disclosure, it has been determined that a sump temperature difference (e.g., the difference in the sump temperature from a first point in time to a second point in time) at or near the beginning of the cleaning process is indicative of how certain other cleaning process parameters, such as wash time (wash phase duration), rinse time (rinse phase duration), and/or rinse temperature, may be adjusted in order to achieve thermal sanitization of the wares subjected to the cleaning process. In accordance with the present disclosure, thermal sanitization module 218 may include instructions executable by the processor(s) 202 to monitor and analyze sump temperatures measured at one or more times during the cleaning and to control one or more cleaning process parameters based on the sump temperature(s) so as to achieve thermal sanitization. For example, thermal sanitization module 218 may analyze sump temperatures measured at one or more times during the cleaning process to determine a difference in sump temperature from a first point in time to a sump temperature at a second point in time, and may automatically determine adjusted cleaning process parameters based on the difference in sump temperature to ensure an adequate cleaning and sanitizing result in achieved. The adjusted cleaning process parameters may be dynamically applied during the current cleaning cycle, and/or they may be applied during subsequent cleaning cycles.

Analysis/reporting module 216 (or any of cleaning process control module 212, thermal sanitization module 218, or other software or module stored in storage devices 208) may generate one or more notifications or reports for storage or for display on user interface 204 of controller 200, or on any other local or remote computing device 250, regarding one or more cleaning cycles. The reports may include data corresponding to one or more specific cleaning cycles, or data concerning cleaning cycles specific to one or more of a location(s), a cleaning machine(s), a date(s)/time(s), an employee, etc. The data may be used to identify trends, areas for improvement, or otherwise assist the organizational person(s) responsible for ensuring the efficacy of cleaning cycles to identify and address problems in the cleaning cycles.

The report(s) for each cleaning process may include information monitored during execution of the cleaning process such as the date and time of the cleaning process, a unique identification of the cleaning cycle, a unique identification of the cleaning machine, a unique identification of the person running the cleaning cycle, an article type cleaned during the cleaning cycle, a rack volume or types of racks or trays used during the cleaning cycle, wash phase duration, rinse phase duration, dwell duration, wash and rinse water temperatures, sump temperatures, wash and rinse water conductivities, wash and rinse water pH, detergent concentration, rinse agent concentration, environmental humidity, water hardness, turbidity, rack temperatures, the types and amounts of chemical product dispensed during each cycle of the cleaning cycle, the volume of water dispensed during each cycle of the cleaning cycle, or other information relevant to the cleaning cycle.

The report(s) may also include any information or data related to control of thermal sanitization during the cleaning process in accordance with the present disclosure, such as sump temperature difference(s) between two or more points in time during the cleaning process, the minimum sump temperature during the cleaning process, the time associated with the minimum sump temperature, the adjusted cleaning process parameters determined based on the sump temperature difference, the total amount of heat energy accumulated over the course of the cleaning cycle, etc.

The report(s) may also include information concerning the location, the business entity/enterprise, corporate clean verification targets and tolerances, cleaning scores by location, region, machine type, date/time, employee, and/or cleaning chemical types, energy costs, chemical product costs, and/or any other cleaning cycle data collected or generated by the system or requested by a user.

In accordance with the present disclosure, it has been determined that a sump temperature difference (e.g., the difference in the sump temperature from a first point in time to a second point in time) at or near the beginning of the cleaning process is indicative of how certain other cleaning process parameters, such as wash time, rinse time, and/or rinse temperature, may be adjusted in order to achieve thermal sanitization of the wares subjected to the cleaning process. In this way, one or more cleaning process parameters may be controlled based on a sump temperature difference measured at a specified point in time during the cleaning process so as to achieve thermal sanitization of wares subjected to a cleaning process in a cleaning machine, independent of the ware type, the ware material, and/or the number or amount of wares to be cleaned.

More specifically, in accordance with one aspect of the present disclosure, it has been determined based on designed experiments that sump temperature is statistically correlated with ware surface temperature. It has thus been further determined that, as certain ware surface temperatures are required to achieve thermal sanitization of the ware, sump temperature may be used as a basis to adjust one or more cleaning process parameters to help ensure thermal sanitization is achieved. In addition, in accordance with the present disclosure, it has been determined that a sump temperature difference experienced during a predetermined time period at or near the beginning of the cleaning process may be used to control or adjust one or more cleaning process parameters so as to achieve thermal sanitization of the ware independent of the ware type, ware material and/or amount of wares in the cleaning machine.

Figure 3:
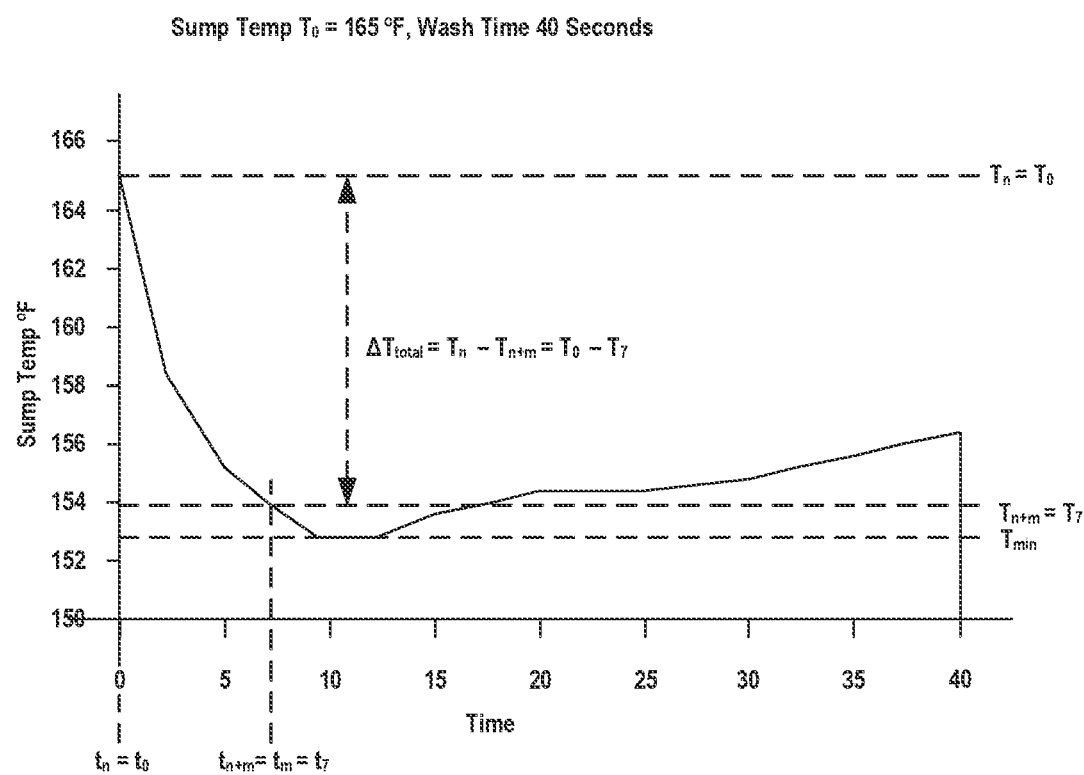
FIG. 3 is a graph of sump temperature versus time for an example wash phase in a dish machine.

FIG. 3 is a graph of sump temperature versus time for an example hypothetical wash phase of a cleaning process in a commercial door or conveyor-type dish machine which illustrates the techniques in accordance with the present disclosure. In this example, the sump temperature at the start of the wash phase ($T_0$) was 165° F. (which was also the sump temperature set point) and the wash time (the duration of the wash phase portion of the cleaning process) was 40 seconds.

In accordance with the present disclosure, the sump temperature/time curve exhibits a characteristic temperature profile, an example of which is shown in FIG. 3. Time t=0 is the beginning of the wash phase. At a first predetermined time t=$t_n$ (time $t_0$, in this example), the sump temperature measured was 165° F. ($T_0$=165° F.). During the wash phase, cleaning solution is pumped from the sump through the wash arms of the dishmachine and is sprayed onto the wares in the wash chamber of the dishmachine. With reference to FIG. 1, for example, cleaning solution 112 is pumped from sump 110 and is sprayed through wash arms 162 onto the wares 102A-102N in the wash chamber 152 of cleaning machine 100. The used cleaning solution 164 is then drained back into sump 110 to be recirculated back into the wash chamber 152 throughout the wash phase (and, in this example, to be reused during subsequent cleaning cycles). During the wash phase shown in FIG. 3, heat from the cleaning solution 112/164 is transferred to the wares 102A-102N and to the interior components of the cleaning machine, causing the temperature of the cleaning solution 112 in the sump as measured by the one or more temperature sensor(s) 114 to generally decrease from time t=0 as shown in FIG. 3. At a specified time, $t_{n+m}$, the sump temperature reaches a temperature, $T_{n+m}$, that is relatively less than the temperature at time $t_n$. In the example of FIG. 3, the first predetermined time, n, is 0 seconds and the predetermined time period, m, is 7 seconds, and the sump temperature at time $t_7$ is about 154° F. The total sump temperature difference, $\Delta T_{total}$, experienced during the time period defined by t=$t_n$ and t=$t_{n+m}$ may be expressed by the equation:

$$\Delta T_{total} = T_n - T_{n+m}.$$

The total sump temperature difference, $\Delta T_{total}$, in the example of FIG. 3 is about 11° F. ($T_0$-$T_7$=165° F.−154° F.=11° F.).

Subsequent to time $t_{n+m}$, the sump temperature begins to rise somewhat until the end of the wash phase due at least in part to heating of the cleaning solution in the sump. During a subsequent rinse phase (not shown in FIG. 3) fresh hot rinse water is sprayed into the wash chamber of the dish machine and onto the wares. The used rinse water is drained into the sump, causing the temperature of the cleaning solution in the sump to increase until the sump temperature set point is reached. A wash cycle parameter referred to as a time between cleaning cycles (Time Between) is a predetermined amount of time that the machine remains idle after completion of one complete cleaning cycle and before the start of the next complete cleaning cycle. During this time, the cleaning solution in the sump may be further heated until the sump temperature set point is reached. After the time between cleaning cycles has elapsed, the cleaning machine is ready to start the next complete cleaning cycle.

In some examples, the system may measure the sump temperature drop vs. time during the cycle to actively monitor and when the minimum sump temperature is achieved. Using continuous temperature monitoring in the sump, the minimum sump temperature ($T_{min}$) may be determined by calculating the slope of the temperature drop in the initial seconds of the cycle. Once the slope is zero and the minimum sump temperature is detected, the minimum sump temperature may be recorded, the HUE value may be predicted, and the cycle may be dynamically adjusted (e.g., wash time, rinse temp, rinse time) to ensure final HUE values are met. The prediction may be based on the minimum sump temperature and/or the sump temperature difference (e.g., the difference between the starting sump temperature and the minimum sump temperature). The prediction may also be based on the time to reach the minimum sump temperature. This would be an additional or alternative calculation by the controller which monitors the temperature profile of the cycle-in-progress to adjust for HUE attainment in addition to or instead setting a pre-determined $T_{n+m}$ value.

As described herein, in accordance with the present disclosure, it has been determined that a total sump temperature difference ($\Delta T_{total}$) 1 experienced during a predetermined time period at or near the beginning of the cleaning process may be used to control or adjust one or more cleaning process parameters so as to achieve thermal sanitization of the ware independent of the ware type, ware material and/or amount of wares in the cleaning machine. In some examples, the predetermined time period may be anywhere between 5 and 15 seconds after the start of the cleaning process. In such examples, the total sump temperature difference ($\Delta T_{total}$) experienced during the first 5 to 15 seconds after the start of the cleaning process may be to control or adjust one or more cleaning process parameters so as to achieve thermal sanitization of the ware independent of the ware type, ware material and/or amount of wares in the cleaning machine.

Figure 4A:
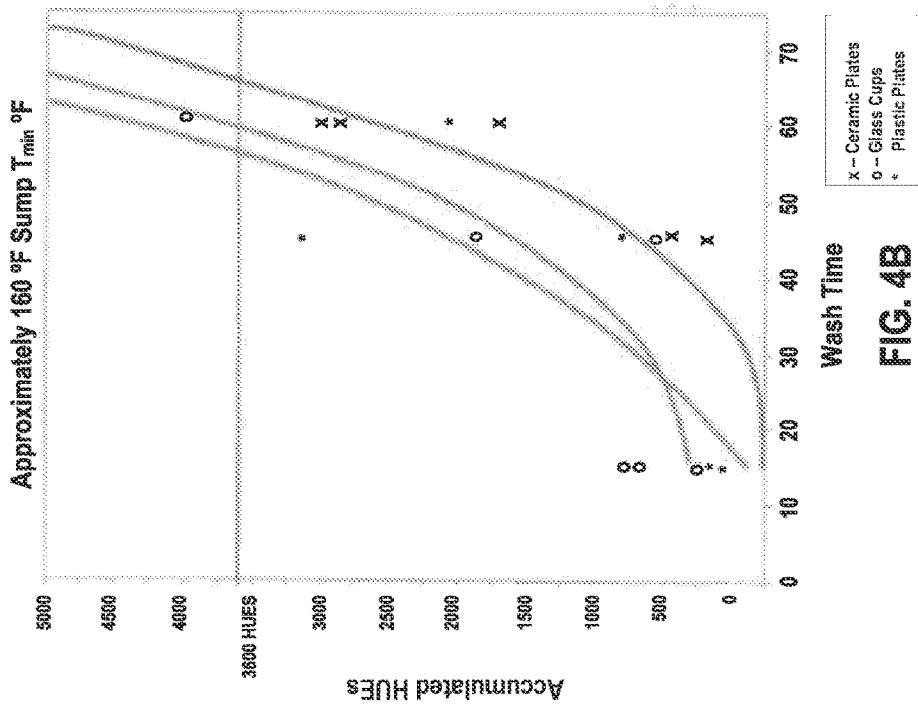
FIG. 4A is a graph of minimum accumulated Heat Unit Equivalents (HUEs) versus sump minimum temperature ($T_{min}$) for several example ware types.
Figure 4B:
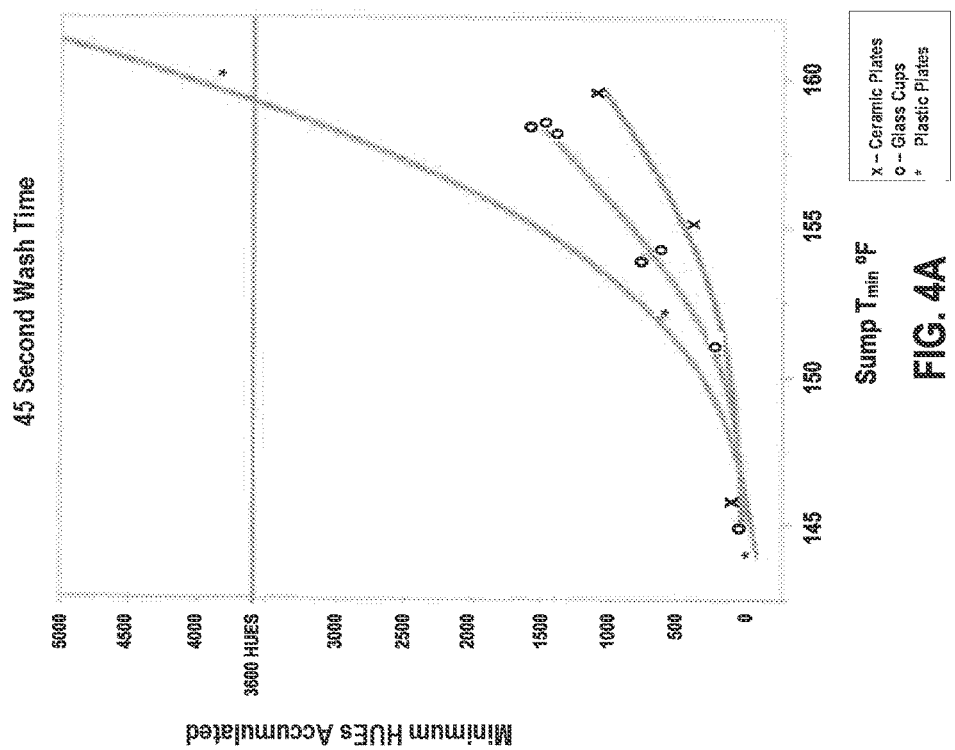
FIG. 4B is a graph of accumulated HUEs versus wash phase time for a sump minimum temperature of approximately 160° F. for several example wash phases in a dish machine.

FIG. 4A is a graph of minimum accumulated Heat Unit Equivalents (HUEs) versus sump minimum temperature ($T_{min}$) for several example ware types for a 45 second wash phase. The data of FIG. 4A indicate that not all ware types achieved thermal sanitization at a wash time of 45 seconds and depending upon the sump minimum temperature. Sanitization can be reached by increasing the wash time and shown in FIG. 4B. FIG. 4B is a graph of accumulated HUEs versus wash phase time for several examples ware types for a sump minimum temperature of approximately 160° F. The results shown in FIGS. 4A and 4B suggest that sump temperature alone may be enough to predict the ability to achieve the NSF 3-2017 standard for thermal sanitization of a ware.

In accordance with the present disclosure, a series of designed experiments (DOE) were performed and predictive models were built to determine whether a sump temperature difference experienced during a predetermined time period at or near the beginning of a wash phase of a cleaning cycle may be correlated with a number of plates (the amount of quantity of wares) subjected to the cleaning cycle. FIG. 5 is a table showing results some of these designed experiments using a number of plates washed during a cleaning process as a variable in accordance with the present disclosure. FIG. 6 is a table showing results of the designed experiments of FIG. 5 using a sump temperature difference during the first 7 seconds of a cleaning process as a variable in accordance with the present disclosure.

The variables input into the model of FIG. 5 were defined as follows:

| Term | Definition |
| --- | --- |
| A-Wash.Time | Wash phase duration |
| C-Time.Between | Predefined idle time between complete cleaning cycles |
| D-Tsump0s | Sump temperature at the start of the wash phase (t = 0) |
| E-Rinse.Time | Rinse phase duration |
| F-Rinse.Temp | Rinse water temperature |
| G-Plate.Nbr | Number of plates subjected to the cleaning cycle |
| H-Final.Cycle.Dwell | Dwell time before completion of cycle |

The variables input into the model of FIG. 6 were defined as follows:

| Term | Definition |
| --- | --- |
| A-Wash.Time | Wash phase duration |
| C-Time.Between | Predefined idle time between complete cleaning cycles |
| D-Tsump0s | Sump temperature at the start of the wash phase (t = 0) |
| E-Rinse.Time | Rinse phase duration |
| F-Rinse.Temp | Rinse water temperature |
| H-Final.Cycle.Dwell | Dwell time before completion of cycle |
| K-Tsump0-7s | Sump temperature difference between t = 0 and t = 7 s |

As shown in FIGS. 5 and 6, comparing predictive equations built from DOE testing with plate number (FIG. 5) versus sump temperature drop in the first 7 seconds (FIG. 6), a model incorporating sump temperature drop in the first 7 seconds gives a final $R^2$ value ($R^2=0.968$) that is comparable to the final $R^2$ value for a model incorporating plate numbers ($R^2=0.977$) as a variable. This indicates that, in accordance with the present disclosure, a sump temperature difference experienced during a predetermined time period at or near the beginning of the wash phase of a cleaning process may be used to predict and/or control thermal sanitization during the cleaning process independent of the ware type, the ware material, and/or the number or amount of wares to be cleaned.

In some examples, the sump temperature difference experienced during the first 7 seconds of the wash phase of the cleaning process may be used to predict and/or control one or more wash cycle parameters, such as wash phase duration, rinse phase duration, and/or rinse temperature, in order to control thermal sanitization of the wares during the cleaning process. However, it shall be understood that other predetermined time periods may also be used, and that the disclosure is not limited in this respect. For example, the beginning of the predetermined time period may start at any appropriate time at or near the beginning of the cleaning process (such as between 0 and 5 seconds after the start of the cleaning process) and the duration of the predetermined time period may be within a range of 3 to 20 seconds. Thus, the predetermined time period may include, for example, the first 5, 7, 8, 10, 12 or 15 seconds of the cleaning process. In other examples, the predetermined time period may include the time period between 2 and 8 seconds after the start of the cleaning process, the time period between 3 and 10 seconds after the start of the cleaning process, the time period between 5 and 15 seconds after the start of the cleaning process, or some other predetermined time period at or near the beginning of the cleaning process. It shall be understood therefore, that the disclosure is not limited in this respect, and that the beginning of the predetermined time period and the duration of the predetermined time period may be different depending upon the machine type, geographical location, and other factors. According to the techniques of the present disclosure, a sump temperature difference experienced during a predetermined time period at or near the beginning of the wash phase of a cleaning process is correlated to whether thermal sanitization will be achieved, and that sump temperature difference may be a factor in predicting thermal sanitization for a cleaning process and/or dynamically controlling one or more cleaning process parameters during the cleaning process to ensure that thermal sanitization is achieved, and that this prediction or control of the cleaning process parameters may be accomplished independent of the ware type, the ware material, and/or the number or amount of wares to be cleaned.

FIGS. 7-10 show examples of how one or more cleaning process parameters may be adjusted to achieve thermal sanitization of wares subjected to a cleaning process in a dish machine based on a sump temperature difference experienced during a predetermined period of time at or near the beginning of a cleaning process in accordance with the present disclosure. In these examples the predetermined time period included the first 7 seconds of the cleaning process (i.e., the difference between the temperature measured at 7 seconds after the start of the cleaning process ($T_7$) and the temperature measured at the start of the cleaning process (To). In FIG. 7, the cycle conditions indicated by reference numeral 270 resulted in a predicted total of 749 HUEs delivered to wares. This is insufficient for thermal sanitization. By adjusting one or more cleaning process parameters using a model such as that shown and described with respect to FIG. 6, the number of HUEs delivered to the wares may be increased to meet or exceed the minimum number of HUEs required to achieve thermal sanitization. For example, by increasing the wash time from 30 seconds to 60 seconds as indicated by reference numeral 272, the predicted heat unit equivalent is increased to 3689 HUEs. As another example, by increasing the rinse temperature from 180 degrees to 190 degrees and the rinse time from 7.5 seconds to 17.5 seconds as indicated by reference numeral 274, the predicted number of heat unit equivalents is increased to 3711 HUEs.

In FIG. 8, the cycle conditions indicated by reference numeral 276 resulted in a predicted total of 1107 HUEs delivered to wares. This is less than the 3600 HUEs required for thermal sanitization. By adjusting one or more cleaning process parameters using a model such as that shown and described with respect to FIG. 6, the number of HUEs delivered to the wares may be increased to meet or exceed the minimum number of HUEs required to achieve thermal sanitization. For example, by increasing the wash time from 43 seconds to 55 seconds, increasing the rinse temperature from 175 degrees to 185 degrees and increasing the rinse time from 7.5 seconds to 12 seconds as indicated by reference numeral 278, the predicted number of heat unit equivalents is increased to 3724 HUEs.

In FIG. 9, the cycle conditions indicated by reference numeral 280 resulted in a predicted total of 240 HUEs delivered to wares. This is less than the 3600 HUEs required for thermal sanitization. By adjusting one or more cleaning process parameters using a model such as that shown and described with respect to FIG. 6, the number of HUEs delivered to the wares may be increased to meet or exceed the minimum number of HUEs required to achieve thermal sanitization. For example, by increasing the wash time from 30 seconds to 43 seconds, increasing the rinse temperature from 180 degrees to 185 degrees and increasing the rinse time from 7.5 seconds to 21 seconds as indicated by reference numeral 282, the predicted heat unit equivalent is increased to 3694 HUEs. As another example, by increasing the rinse temperature from 180 degrees to 185 degrees and increasing the rinse time from 7.5 seconds to 31.5 seconds as indicated by reference numeral 284, the predicted heat unit equivalent is increased to 3633 HUEs.

In FIG. 10, the cycle conditions indicated by reference numeral 286 resulted in a predicted total of 15,000 HUEs delivered to wares. This is far higher than the 3600 HUEs required for thermal sanitization. By adjusting one or more cleaning process parameters using a model such as that shown and described with respect to FIG. 6, the number of HUEs delivered to the wares may be decreased so that the number of HUEs delivered during the cleaning process satisfies, but does not greatly exceed, the minimum number of HUEs required to achieve thermal sanitization. For example, by decreasing the wash time from 43 seconds to 27 seconds as indicated by reference numeral 288, the predicted number of heat unit equivalents is decreased to 3616 HUEs. As another example, by decreasing the wash time from 43 seconds to 30 seconds, decreasing the rinse temperature from 185 degrees to 172 degrees and decreasing the rinse time from 15 seconds to 12.5 seconds as indicated by reference numeral 290, the predicted number of heat unit equivalents is increased to 3633 HUEs. The techniques of the present disclosure can thus help save energy, water and cost by tailoring the cleaning process parameters to ensure that the requisite number of HUEs required for thermal sanitization are delivered, but not greatly exceeded, during the cleaning process.

Although FIGS. 7-10 illustrate specific examples of how one or more cleaning process parameters may be adjusted to predict the number of heat unit equivalents delivered during a cleaning process, and/or to ensure thermal sanitization is achieved, it shall be understood that these are for example purposes only, and that the disclosure is not limited to the specific numeric examples shown in FIGS. 7-10. In addition, it shall be understood that the disclosure is not limited to adjustment of cleaning process parameters such as wash time, rinse time, and rinse temperature, that other cleaning process parameters may also be adjusted in order to achieve thermal sanitization of wares, and that the disclosure is not limited in this respect.

Figure 11:
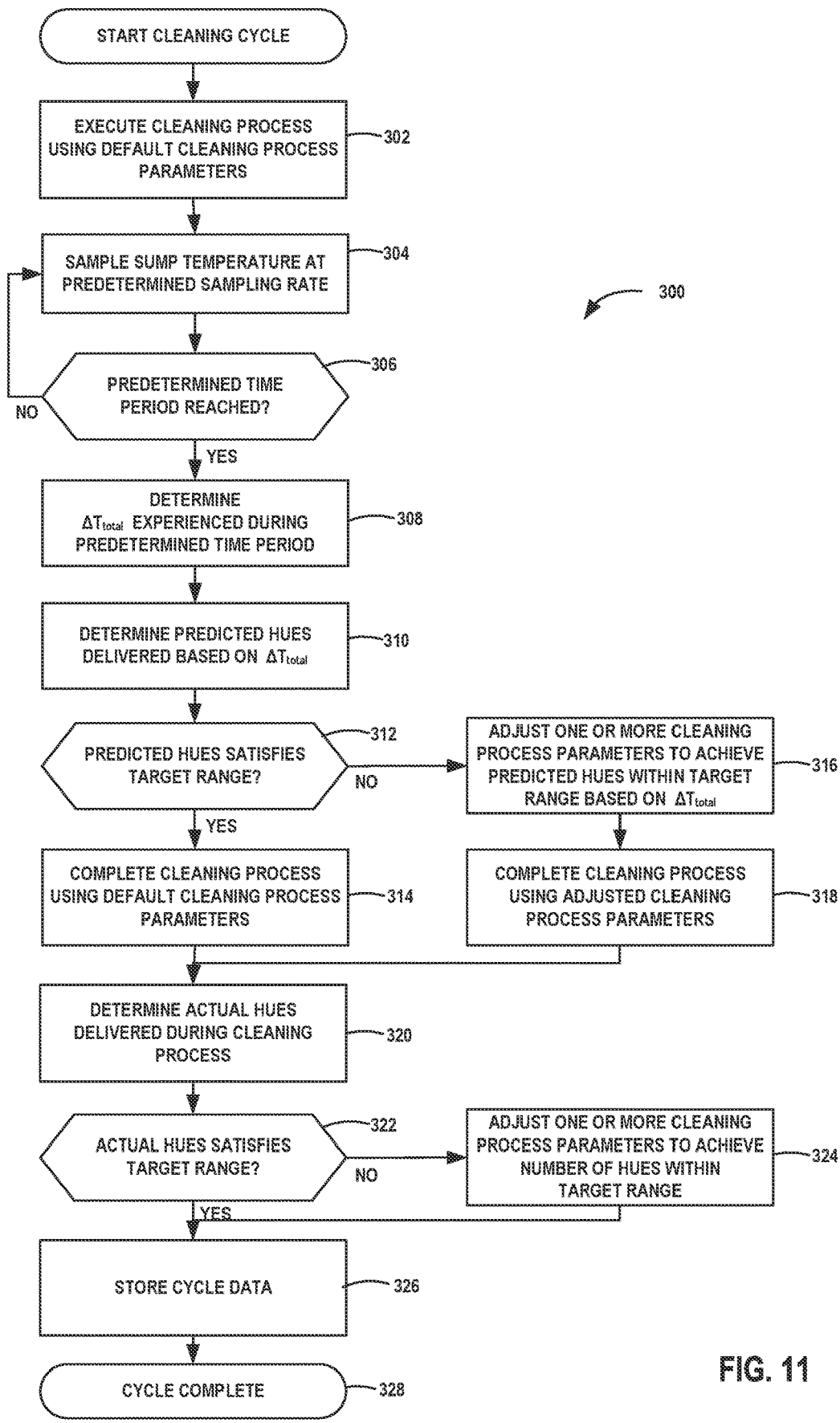
FIG. 11 is a flowchart illustrating an example process (300) by which a computing device controls one or more cleaning process parameters in a cleaning machine based on a sump temperature difference in accordance with the present disclosure.

FIG. 11 is a flowchart illustrating an example process (300) by which a computing device controls one or more cleaning cycles in a cleaning machine based on a sump temperature difference experienced during a predetermined time period at or near the beginning of a wash phase of a cleaning process in accordance with the present disclosure. For example, the cleaning machine may include a dish machine and the articles to be cleaned may include wares such as dinnerware, flatware, glassware, pots and pans, cooking utensils, etc. The computing device may include, for example, a controller such as example cleaning machine controller 200 of FIG. 2, and the process (300) may be controlled based on execution of instructions stored in cleaning process control module 212 and thermal sanitization module 218, and executed by processor(s) 202.

At the start of the cleaning process (302), the computing device of the automated cleaning machine begins execution of a cleaning cycle using default cycle parameters (303). For example, the computing device may send one or more command signal(s) to a cleaning machine (such as cleaning machine 100 as shown in FIG. 1) to execute a cleaning process using the default cycle parameters. The default cleaning process parameters, such as wash phase duration, rinse phase duration, cleaning product concentrations, wash water temperatures, rinse water temperatures, etc., are designed to minimize energy and/or cleaning product usage and thus to minimize energy and product related costs with the goal of achieving adequate cleaning and sanitization of the articles inside the machine. The default cleaning process parameters may be stored in, for example, storage device(s) 208 as cleaning process parameters 214 as shown in FIG. 2. The default cleaning process parameters may be determined based in part based on one or more settings manually input or selected by a user at the start of the cleaning process; for example, a user may select the type of cleaning cycle to be run, such as a regular cleaning cycle, a heavy duty cleaning cycle, a pot/pan cleaning cycle, etc., and the computing device may determine the default cleaning process parameters associated with the user-selected cleaning cycle by retrieving them from cleaning process parameters 214.

At one or more times during execution of the cleaning process, the controller samples the temperature of the cleaning solution in the sump (the "sump temperature") (304). For example, the computing device may receive sump temperature information from one or more temperature sensors positioned to measure the temperature of the cleaning solution in the sump, such as temperature sensor 114 as shown in FIG. 1. The sump temperature may be sampled continuously throughout the cleaning process and/or may be sampled at one or more predetermined times during execution of the cleaning process.

In accordance with the present disclosure, the controller further determines the sump temperature at at least two predetermined points in time during the wash phase portion of the cleaning process. For example, the controller may determine the sump temperature at a first specified time ($t_n$) and at a second, subsequent specified time ($t_{n+m}$) during the wash phase portion of the cleaning process. The first and second specified times may be selected such that the time period defined by $t_n$ and $t_{n+m}$ occurs at or near the beginning of the wash phase portion of the cleaning process, so as to capture a sump temperature difference experienced during a predetermined time period at or near the beginning of the wash phase portion of the cleaning process that has been determined to be correlated with the total number of heat unit equivalents delivered to the wash chamber of the cleaning machine during the cleaning process. In some examples, the first specified time, $t_n$, may be specified as the start time of the wash phase such that $t_n = t_0$, and the second specified time, $t_{n+m}$ or $t_m$ in this example, may be specified such that the temperature difference experienced during the time interval between time $t_0$ and $t_m$ is correlated with the total number of heat unit equivalents delivered during the cleaning process.

The cleaning machine executes the cleaning cycle using the default cleaning process parameters until the second specified time, $t_{n+m}$, is reached (306). The controller determines the total temperature difference that occurred during the predetermined time period (308). For example, the controller may be determine the total temperature difference experienced during the predetermined time period according to the equation:

$$\Delta T_{total} = T_n - T_{n+m},$$

where $T_n$ is the sump temperature taken at time t=n, and $T_{n+m}$ is the sump temperature taken at time t=n+m.

In some examples, the predetermined time period is the time period occurring during the first m seconds of the wash phase portion of the cleaning process, so that $t_n = t_0$ and:

$$\Delta T_{total} = T_0 - T_m.$$

In some examples, the predetermined time period is the time period occurring during the first 7 seconds of the wash phase portion of the cleaning process, so that:

$$\Delta T_{total} = T_0 - T_7.$$

The controller predicts the number of heat unit equivalents that will be delivered to the wares to be cleaned based on the sump temperature difference experienced during a predetermined time period at or near the beginning of the cleaning cycle (310). For example, the controller may predict the number of heat unit equivalents that will be delivered based on a set of one or more predictive equation(s) as described above with respect to the example of FIG. 6. In some examples, the controller predicts the number of heat unit equivalents that will be delivered based on a predictive equation including the following variables: a sump temperature measured at 0 seconds (the start of the wash phase), a wash time (duration of the wash phase), a time between cycles (a machine idle time), a rinse temperature, a rinse time (duration of the rinse phase), a post cycle dwell time, and a sump temperature measured at 7 seconds into the wash phase. In this example, the wash time, time between cycles, rinse temperature, rinse time, and post cycle dwell time are preset cleaning process parameters received and/or stored by the cleaning machine controller. The sump temperatures measured at 0 and 7 seconds into the wash phase are actual measured temperatures of the cleaning solution in the sump measured at 0 and 7 seconds into the wash phase, respectively.

The controller determines whether the predicted number of heat unit equivalents satisfies a target range for the number of heat unit equivalents to be delivered to ensure thermal sanitization (312). The target range may include a minimum target number of heat unit equivalents to be delivered, wherein the minimum is selected to ensure that the minimum number of heat unit equivalents for thermal sanitization is met (e.g., currently established at 3600 HUEs). The target range may further include a maximum number of heat unit equivalents to be delivered, wherein the maximum is selected to ensure that the minimum number of heat unit equivalents is met but not greatly exceeded. The maximum may be expressed as an absolute value (e.g., 3650 HUEs, 3700 HUEs, etc.), as a percentage of the minimum (e.g., 103%, 105%, etc.), or by any other appropriate method.

If the predicted number of HUEs satisfies the target range (YES branch of step 312), this means that the controller predicts that the minimum requirements for thermal sanitization will be met over the course of the cleaning process, and the controller therefore completes the cleaning process using the current cleaning process parameters (314).

If the predicted number of HUEs does not satisfy the target range (NO branch of step 312), this means that the controller predicts that the minimum requirements for thermal sanitization will not be met over the course of the cleaning process. The controller then determines one or more adjusted cleaning process parameters based on the sump temperature difference experienced during the predetermined time period at or near the beginning of the wash phase portion of the cleaning process (316). For example, the controller may, based on one or more predictive equations such as described above with respect to FIG. 6, adjust one or more cleaning process parameters so that the predicted number of HUEs delivered satisfies the target range. The adjusted cleaning process parameters may include, for example, a wash time, a rinse time, and/or a rinse temperature, and/or any other appropriate cleaning process parameter. The controller then completes the cleaning process using the one or more adjusted cleaning process parameters (318). In this way, one or more cleaning process parameters may be controlled based on a sump temperature difference so as to achieve thermal sanitization of wares subjected to a cleaning process in a cleaning machine, independent of the ware type, the ware material, and/or the number or amount of wares to be cleaned.

In some examples, at or near the completion of the cleaning process, the controller may calculate the actual number of HUEs delivered over the course of the cleaning process based on actual measured sump and rinse water temperatures, the actual wash time, actual rinse time, etc. (320). If the actual number of HUEs delivered satisfies the target range (322), this indicates that the minimum requirements for thermal sanitization were met over the course of the cleaning process. If the actual number of HUEs delivered does not satisfy the target range (322), this indicates that the minimum requirements for thermal sanitization were not met over the course of the cleaning process. The controller may then adjust one or more cleaning process parameters to ensure that the minimum requirements for thermal sanitization are met before completion of the cleaning process (324). For example, the controller may extend the duration of the rinse phase for a predetermined amount of time, increase the rinse temperature, and/or add a second rinse phase at a predetermined rinse temperature for a predetermined amount of time, or adjust one or more other cleaning process parameters in one or more other ways that are calculated to achieve the minimum thermal sanitization requirements.

The computing device may determine and store cycle data associated with the cleaning process (326), such as a cycle type (e.g., normal, glassware, pots and pans, etc.), the default cycle parameters associated with the cleaning cycle, predicted HUEs delivered based on the default cycle parameters, adjusted cleaning process parameters based on the temperature difference experienced during the predetermined time period, actual number of HUEs delivered, actual machine parameters measured or sensed during the cleaning cycle, an updated cycle count, a time and date stamp, a machine id, a cycle id, a location, store, and/or corporate id, and/or any other data associated with or generated during the cleaning cycle. The cycle data may be stored in, for example, data storage 210 of storage device(s) 208 as shown in FIG. 2. The cleaning process is then complete (328).

In some examples, step (316) of process (300) may further include determining a machine idle time measured from completion of a previous cleaning process to initiation of the current cleaning process. If the machine is idle for an extended period of time, the sump temperature may cool to an extent such that the starting temperature is too low to achieve thermal sanitization using the default wash time, rinse time, etc. In such examples, the computing device may adjust one or more of the cleaning process parameters such that the revised predicted number of HUEs that will be delivered during the cleaning process based on the sump temperature difference and the machine idle time satisfies the target range indicative of thermal sanitization. The computing device may then control execution of a remaining portion of the cleaning process using the one or more adjusted cleaning process parameters (318).

NSF Standard NSF/ANSI 3-2017 related to commercial ware washing equipment states that to ensure adequate sanitization, the complete cycle of hot water sanitizing machines shall deliver a minimum of 3600 heat unit equivalents (HUE) at all the surface of dishes. Annex A page 25 of the NSF 3-2017 standard lists HUE values corresponding to temperature. These values may be modeled as an equation for determining the number of heat unit equivalents delivered at a temperature as:

$$HUE_t = 5.50211886584334E\text{-}17 * \exp(0.262317859742146 * x),$$

where t is a specified point in time, and x is the temperature at the specified point in time.

In order to determine the number of HUEs delivered over a particular time period during a cleaning cycle, the temperature of the cleaning solution delivered to the wares (measured in the sump, for example) may be measured periodically, the corresponding HUE values calculated, and the HUEs summed for the time period in question. For example, the sump temperature may be measured once per second, the corresponding HUE values calculated for each temperature measurement, and the HUEs summed for the time period.

In accordance with the techniques of the present disclosure, this method may be used to determine the number of HUEs delivered during a predetermined time period at or near the beginning of the wash phase based on a sump temperature difference experienced during the predetermined time period, and to predict the total number of HUEs that will be delivered over the course of the cleaning process. If the predicted number of HUEs does not satisfy a target, one or more cleaning process parameters of the cleaning machine may be adjusted to ensure that thermal sanitization of the wares during the cleaning cycle is achieved.

In one or more examples, the functions described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements. The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware. It is to be recognized that depending on the example, certain acts or events of any of the methods described herein can be performed in a different sequence, may be added, merged, or left out altogether (e.g., not all described acts or events are necessary for the practice of the method). Moreover, in certain examples, acts or events may be performed concurrently, e.g., through multi-threaded processing, interrupt processing, or multiple processors, rather than sequentially. In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

EXAMPLES

Example 1: An automated cleaning machine comprising a housing defining a wash chamber in which articles to be cleaned are subjected to a cleaning process; a sump configured to receive and store a cleaning solution; at least one processor; at least one storage device that stores default cleaning process parameters including one or more of a wash time, a rinse temperature, and a rinse time; the at least one storage device further comprising instructions executable by the at least one processor to: control execution by the cleaning machine of at least an initial portion of the cleaning process using the default cleaning process parameters; determine a first temperature of the cleaning solution in the sump at a first predetermined time during execution of the cleaning process; determine a second temperature of the cleaning solution in the sump at a second predetermined time during execution of the cleaning process, wherein the second predetermined time is subsequent to the first predetermined time; determine a sump temperature difference between the first temperature and the second temperature; predict a number of heat unit equivalents (HUEs) that will be delivered during the cleaning process based on the sump temperature difference; in response to the predicted number of heat unit equivalents not satisfying a target range indicative of thermal sanitization, adjust one or more of the cleaning process parameters such that a revised predicted number of HUEs that will be delivered during the cleaning process based on the sump temperature difference satisfies the target range indicative of thermal sanitization; and control execution of a remaining portion of the cleaning process using the one or more adjusted cleaning process parameters.

Example 2: The automated cleaning machine of claim 1, the at least one storage device further comprising instructions executable by the at least one processor to predict a number of HUEs that will be delivered during the cleaning process based on the sump temperature difference, the wash time, the rinse temperature, and the rinse time.

Example 3: The automated cleaning machine of claim 1, where the one or more adjusted cleaning process parameters include the wash time.

Example 4: The automated cleaning machine of claim 1, where the one or more adjusted cleaning process parameters include the rinse time.

Example 5: The automated cleaning machine of claim 1, where the one or more adjusted cleaning process parameters include the rinse time and the rinse temperature.

Example 6: The automated cleaning machine of claim 1, where the one or more adjusted cleaning process parameters include the wash time, the rinse time and the rinse temperature.

Example 7: The automated cleaning machine of claim 1, the at least one storage device further comprising instructions executable by the at least one processor to predict a number of HUEs that will be delivered during the cleaning process based on a predictive equation that includes the sump temperature difference as a variable modeled from experimental data that is statistically correlated with a predictive equation that includes a number of articles in the wash chamber of the cleaning machine during the cleaning process modeled from the experimental data.

Example 8: The automated cleaning machine of claim 1, wherein the target range indicative of thermal sanitization includes a minimum target of 3600 HUEs.

Example 9: The automated cleaning machine of claim 1, wherein the target range indicative of thermal sanitization includes a range between 3600 HUEs and 3700 HUEs.

Example 10: The automated cleaning machine of claim 1, wherein the cleaning process is a current cleaning process, the at least one storage device further comprising instructions executable by the at least one processor to: determine a machine idle time measured from completion of a previous cleaning process to initiation of the current cleaning process; adjust one or more of the cleaning process parameters such that the revised predicted number of HUEs that will be delivered during the cleaning process based on the sump temperature difference and the machine idle time satisfies the target range indicative of thermal sanitization; and control execution of a remaining portion of the cleaning process using the one or more adjusted cleaning process parameters.

Example 11: A method comprising controlling execution of a cleaning process by a cleaning machine of at least an initial portion of the cleaning process using default cleaning process parameters, the cleaning process including delivering a cleaning solution from a sump associated with the cleaning machine into a wash chamber of the cleaning machine into which articles to be cleaned are present; determining a first temperature of the cleaning solution in the sump at a first predetermined time during execution of the cleaning process; determining a second temperature of the cleaning solution in the sump at a second predetermined time during execution of the cleaning process, wherein the second predetermined time is subsequent to the first predetermined time; determining a sump temperature difference between the first temperature and the second temperature; predicting a number of heat unit equivalents (HUEs) that will be delivered to the wash chamber of the cleaning machine during the cleaning process based on the sump temperature difference; in response to the predicted number of heat unit equivalents not satisfying a target range indicative of thermal sanitization, adjusting one or more of the cleaning process parameters such that a revised predicted number of HUEs that will be delivered during the cleaning process based on the sump temperature difference satisfies the target range indicative of thermal sanitization; and controlling execution of a remaining portion of the cleaning process using the one or more adjusted cleaning process parameters.

Example 12: The method of claim 11, further comprising predicting a number of HUEs that will be delivered during the cleaning process based on the sump temperature difference, the wash time, the rinse temperature, and the rinse time.

Example 13: The method of claim 11, where the one or more adjusted cleaning process parameters include the wash time.

Example 14: The method of claim 11, where the one or more adjusted cleaning process parameters include the rinse time.

Example 15: The method of claim 11, where the one or more adjusted cleaning process parameters include the rinse time and the rinse temperature.

Example 16: The method of claim 11, where the one or more adjusted cleaning process parameters include the wash time, the rinse time and the rinse temperature.

Example 17: The method of claim 1, further comprising predicting a number of HUEs that will be delivered during the cleaning process based on a predictive equation that includes the sump temperature difference as a variable.

Example 18: The method of claim 1, wherein the target range indicative of thermal sanitization includes a minimum target of 3600 HUEs.

Example 19: The method of claim 1, wherein the cleaning process is a current cleaning process, the method further comprising determining a machine idle time measured from completion of a previous cleaning process to initiation of the current cleaning process; adjusting one or more of the cleaning process parameters such that the revised predicted number of HUEs that will be delivered during the cleaning process based on the sump temperature difference and the machine idle time satisfies the target range indicative of thermal sanitization; and controlling execution of a remaining portion of the cleaning process using the one or more adjusted cleaning process parameters.

Example 20: A non-volatile computer-readable storage medium comprising instructions that, when executed by a processor, configure the processor to: control execution by a cleaning machine of at least an initial portion of a cleaning process using default cleaning process parameters; determine a first temperature of a cleaning solution in a sump of the cleaning machine at a first predetermined time during execution of the cleaning process; determine a second temperature of the cleaning solution in the sump of the cleaning machine at a second predetermined time during execution of the cleaning process, wherein the second predetermined time is subsequent to the first predetermined time; determine a sump temperature difference between the first temperature and the second temperature; predict a number of heat unit equivalents (HUEs) that will be delivered during the cleaning process based on the sump temperature difference; in response to the predicted number of heat unit equivalents not satisfying a target range indicative of thermal sanitization, adjust one or more of the cleaning process parameters such that a revised predicted number of HUEs that will be delivered during the cleaning process based on the sump temperature difference satisfies the target range indicative of thermal sanitization; and control execution of a remaining portion of the cleaning process using the one or more adjusted cleaning process parameters.

Various examples have been described. These and other examples are within the scope of the following claims.

The invention claimed is:

1. An automated cleaning machine comprising:
a housing defining a wash chamber in which articles to be cleaned are subjected to a cleaning process;
a sump configured to receive and store a cleaning solution;
at least one processor;
at least one storage device that stores values of cleaning process parameters including one or more of a wash time, a rinse temperature, and a rinse time;
the at least one storage device further comprising instructions executable by the at least one processor to cause the automated cleaning machine to:
control execution by the automated cleaning machine of at least an initial portion of the cleaning process using the values of the cleaning process parameters; and
prior to completion of the cleaning process:
determine a first temperature of the cleaning solution in the sump at a first predetermined time during execution of the cleaning process;
determine a second temperature of the cleaning solution in the sump at a second predetermined time during execution of the cleaning process, wherein the second predetermined time is subsequent to the first predetermined time;
determine a sump temperature difference between the first temperature and the second temperature;
predict a number of heat unit equivalents (HUEs) that will be delivered during the cleaning process based on the sump temperature difference;
in response to the predicted number of HUEs not satisfying a target range indicative of thermal sanitization, adjust the values of one or more of the cleaning process parameters such that a revised predicted number of HUEs that will be delivered during the cleaning process based on the sump temperature difference satisfies the target range indicative of thermal sanitization; and
control execution of a remaining portion of the cleaning process using the adjusted values of the cleaning process parameters.

2. The automated cleaning machine of claim 1, the at least one storage device further comprising instructions executable by the at least one processor to cause the automated cleaning machine to:
predict the number of HUEs that will be delivered during the cleaning process based on the sump temperature difference, the wash time, the rinse temperature, and the rinse time.

3. The automated cleaning machine of claim 1, where the adjusted values of the cleaning process parameters include an adjusted value of the wash time.

4. The automated cleaning machine of claim 1, where the adjusted values of the cleaning process parameters include an adjusted value of the rinse time.

5. The automated cleaning machine of claim 1, where the adjusted values of the cleaning process parameters include adjusted values of the rinse time and the rinse temperature.

6. The automated cleaning machine of claim 1, where the adjusted values of the cleaning process parameters include adjusted values of the wash time, the rinse time and the rinse temperature.

7. The automated cleaning machine of claim 1, the at least one storage device further comprising instructions executable by the at least one processor to cause the automated cleaning machine to:
predict the number of HUEs that will be delivered during the cleaning process based on a first predictive equation that includes the sump temperature difference as a variable modeled from experimental data that is statistically correlated with a second predictive equation that includes a number of the articles in the wash chamber of the automated cleaning machine during the cleaning process modeled from the experimental data.

8. The automated cleaning machine of claim 1, the at least one storage device further comprising instructions executable by the at least one processor to cause the automated cleaning machine to generate one or more notifications for display on a user interface of a computing device, wherein the one or more notifications include data corresponding to the cleaning process.

9. The automated cleaning machine of claim 8, wherein the data corresponding to the cleaning process includes one or more of:
the values of the cleaning process parameters; the first and second temperatures in the sump; the sump temperature difference; a date and time of the cleaning process; a unique identification of the cleaning process; a unique identification of the automated cleaning machine; a unique identification of a person running the cleaning process; an article type cleaned during the cleaning process; a rack volume or types of racks or trays used during the cleaning process; a wash phase duration; a rinse phase duration; a dwell duration; wash and rinse water temperatures; wash and rinse water conductivities; wash and rinse water pH values; a detergent concentration; a rinse agent concentration; an environmental humidity; a water hardness; a turbidity; rack temperatures; a type and amount of chemical product dispensed during each cycle of the cleaning process; a volume of water dispensed during each cycle of the cleaning process; and other information relevant to the cleaning process.

10. The automated cleaning machine of claim 1, wherein the cleaning process is a current cleaning process, the at least one storage device further comprising instructions executable by the at least one processor to cause the automated cleaning machine to:
determine a machine idle time measured from completion of a previous cleaning process to initiation of the current cleaning process;
adjust the values of one or more of the cleaning process parameters such that the revised predicted number of HUEs that will be delivered during the current cleaning process based on the sump temperature difference and the machine idle time satisfies the target range indicative of thermal sanitization; and
control execution of the remaining portion of the current cleaning process using the adjusted values of the one or more of the cleaning process parameters.

11. A method comprising:
controlling execution of a cleaning process by a cleaning machine of at least an initial portion of the cleaning process using values of cleaning process parameters stored in a storage device of the cleaning machine, the cleaning process including delivering a cleaning solution from a sump associated with the cleaning machine into a wash chamber of the cleaning machine into which articles to be cleaned are present; and
prior to completion of the cleaning process:
determining a first temperature of the cleaning solution in the sump at a first predetermined time during execution of the cleaning process;
determining a second temperature of the cleaning solution in the sump at a second predetermined time during execution of the cleaning process, wherein the second predetermined time is subsequent to the first predetermined time;
determining a sump temperature difference between the first temperature and the second temperature;
predicting a number of heat unit equivalents (HUEs) that will be delivered to the wash chamber of the cleaning machine during the cleaning process based on the sump temperature difference;
in response to the predicted number of HUEs not satisfying a target range indicative of thermal sanitization, adjusting the values of one or more of the cleaning process parameters such that a revised predicted number of HUEs that will be delivered during the cleaning process based on the sump temperature difference satisfies the target range indicative of thermal sanitization; and
controlling execution of a remaining portion of the cleaning process using the adjusted values of the cleaning process parameters.

12. The method of claim 11, further comprising:
predicting the number of HUEs that will be delivered during the cleaning process based on the sump temperature difference, a wash time, a rinse temperature, and a rinse time.

13. The method of claim 11, where the adjusted values of the cleaning process parameters include an adjusted value of a wash time.

14. The method of claim 11, where the adjusted values of the cleaning process parameters include an adjusted value of a rinse time.

15. The method of claim 11, where the adjusted values of the cleaning process parameters include adjusted values of a rinse time and a rinse temperature.

16. The method of claim 11, where the adjusted values of the cleaning process parameters include adjusted values of a wash time, a rinse time and a rinse temperature.

17. The method of claim 11, further comprising:
predicting the number of HUEs that will be delivered during the cleaning process based on a predictive equation that includes the sump temperature difference as a variable.

18. The method of claim 11, wherein the target range indicative of thermal sanitization includes a minimum target of 3600 HUEs.

19. The method of claim 11, wherein:
the cleaning process is a current cleaning process,
the method further comprises determining a machine idle time measured from completion of a previous cleaning process to initiation of the current cleaning process,
adjusting the values of one or more of the cleaning process parameters comprises adjusting the values of the cleaning process parameters such that the revised predicted number of HUEs that will be delivered during the current cleaning process based on the sump temperature difference and the machine idle time satisfies the target range indicative of thermal sanitization, and
the method further comprises controlling execution of a remaining portion of the cleaning process using the adjusted values of the one or more of the cleaning process parameters.

20. A non-volatile computer-readable storage medium comprising instructions that, when executed by a processor, configure the processor to:
control execution by a cleaning machine of at least an initial portion of a cleaning process using values of cleaning process parameters stored in a storage device of the cleaning machine, the cleaning process including delivering cleaning solution from a sump of the cleaning machine into a wash chamber of the cleaning machine into which articles to be cleaned are present; and
prior to completion of the cleaning process:
determine a first temperature of a cleaning solution in the sump of the cleaning machine at a first predetermined time during execution of the cleaning process;
determine a second temperature of the cleaning solution in the sump of the cleaning machine at a second predetermined time during execution of the cleaning process, wherein the second predetermined time is subsequent to the first predetermined time;
determine a sump temperature difference between the first temperature and the second temperature;
predict a number of heat unit equivalents (HUEs) that will be delivered during the cleaning process based on the sump temperature difference;
in response to the predicted number of HUEs not satisfying a target range indicative of thermal sanitization, adjust the values of one or more of the cleaning process parameters such that a revised predicted number of HUEs that will be delivered during the cleaning process based on the sump temperature difference satisfies the target range indicative of thermal sanitization; and
control execution of a remaining portion of the cleaning process using the adjusted values of the cleaning process parameters.

\* \* \* \* \*